United States Patent [19]

Shimp et al.

[11] 3,916,388

[45] Oct. 28, 1975

[54] SHIFTING APPARATUS FOR AUTOMATIC DATA ALIGNMENT

[75] Inventors: Everett Montague Shimp, Endwell; Nicholas Bernard Sliz, Apalachin, both of N.Y.

[73] Assignee: IBM Corporation, Armonk, N.Y.

[22] Filed: May 30, 1974

[21] Appl. No.: 474,825

[52] U.S. Cl. .......... 340/172.5
[51] Int. Cl.$^2$ .......... G06F 15/00
[58] Field of Search .......... 340/172.5

[56] References Cited

UNITED STATES PATENTS

| | | | |
|---|---|---|---|
| 3,270,325 | 8/1966 | Carter et al. | 340/172.5 |
| 3,626,374 | 12/1971 | Chinlund | 340/172.5 |
| 3,739,352 | 6/1973 | Packard | 340/172.5 |

*Primary Examiner*—David H. Malzahn
*Attorney, Agent, or Firm*—John E. Hoel; John W. Henderson, Jr.

[57] ABSTRACT

An improved multibyte data shifting apparatus is disclosed for use in a microprogram controlled data processing system to efficiently shift a multibyte data field accessed from a structured memory where it was stored across the boundary between a first and second memory word, and to load the data field justified, into a processor register. The shifting apparatus is responsive to a first microprogram control word specifying the multibyte data field length, to shift a first plurality of bytes accessed from the first memory word and to load it into a processor register in a position shifted such that the total multibyte field to be accessed will be justified. The amount of shift is determined by a binary adder operating on the low order bits of the storage address and the field length data. The binary adder generates a carry output which indicates that the multibyte field accessed lies across a memory word boundary. The carry output is connected to a branching unit in the microprogram controller causing the controller to branch to a second microprogram control word. The shifting apparatus is then responsive to the second microprogram control word to shift a second plurality of bytes, as the remaining portion of the multibyte field, accessed from the second memory word and to load it justified in the processor register. The multibyte data field is thereby accessed and justified in no more than two control word cycles. Both read and store accessing is accommodated by the invention.

16 Claims, 23 Drawing Figures

| | | | | INSERT 0 FLAGS | | | | | | |
|---|---|---|---|---|---|---|---|---|---|---|
| LG0 | LG1 | LG2 | INSERT 0'S FORMAT | BYTE 0 | BYTE 1 | BYTE 2 | BYTE 3 | BYTE 4 | BYTE 5 | BYTE 6 |
| 0 | 0 | 0 | 1 | X | X | X | X | X | X | X |
| 0 | 0 | 1 | 1 | X | X | X | X | X | X | |
| 0 | 1 | 0 | 1 | X | X | X | X | X | | |
| 0 | 1 | 1 | 1 | X | X | X | X | | | |
| 1 | 0 | 0 | 1 | X | X | X | | | | |
| 1 | 0 | 1 | 1 | X | X | | | | | |
| 1 | 1 | 0 | 1 | X | | | | | | |
| 1 | 1 | 1 | 1 | | | | | | | |
| – | – | – | 0 | | | | | | | |

TRUTH TABLE

| LG0 | LG1 | LG2 | ROB FLAGS BYTE 0 | 1 | 2 | 3 | 4 | 5 | 6 | 7 |
|---|---|---|---|---|---|---|---|---|---|---|
| 0 | 0 | 0 | – | – | – | – | – | – | – | X |
| 0 | 0 | 1 | – | – | – | – | – | – | X | X |
| 0 | 1 | 0 | – | – | – | – | – | X | X | X |
| 0 | 1 | 1 | – | – | – | – | X | X | X | X |
| 1 | 0 | 0 | – | – | – | X | X | X | X | X |
| 1 | 0 | 1 | – | – | X | X | X | X | X | X |
| 1 | 1 | 0 | – | X | X | X | X | X | X | X |
| 1 | 1 | 1 | | | | | | | | |

| | | | L FLAGS BYTE | | | | | | | |
|---|---|---|---|---|---|---|---|---|---|---|
| S0 | S1 | S2 | 0 | 1 | 2 | 3 | 4 | 5 | 6 | 7 |
| 0 | 0 | 0 | – | X | X | X | X | X | X | X |
| 0 | 0 | 1 | – | – | X | X | X | X | X | X |
| 0 | 1 | 0 | – | – | – | X | X | X | X | X |
| 0 | 1 | 1 | – | – | – | – | X | X | X | X |
| 1 | 0 | 0 | – | – | – | – | – | X | X | X |
| 1 | 0 | 1 | – | – | – | – | – | – | X | X |
| 1 | 1 | 0 | – | – | – | – | – | – | – | X |
| 1 | 1 | 1 | – | – | – | – | – | – | – | – |

| P0 | P1 | P2 | 0 | 1 | 2 | 3 | 4 | 5 | 6 | 7 |
|---|---|---|---|---|---|---|---|---|---|---|
| | | | A FLAGS BYTE | | | | | | | |
| 0 | 0 | 0 | – | – | – | – | – | – | – | – |
| 0 | 0 | 1 | X | – | – | – | – | – | – | – |
| 0 | 1 | 0 | X | X | – | – | – | – | – | – |
| 0 | 1 | 1 | X | X | X | – | – | – | – | – |
| 1 | 0 | 0 | X | X | X | X | – | – | – | – |
| 1 | 0 | 1 | X | X | X | X | X | – | – | – |
| 1 | 1 | 0 | X | X | X | X | X | X | – | – |
| 1 | 1 | 1 | X | X | X | X | X | X | X | – |

| | | | | | SHIFT GATES ACTIVE | | | | | |
|---|---|---|---|---|---|---|---|---|---|---|
| S0 | S1 | S2 | READ WORD | WRITE WORD | R01 | R1 | R2 | R3 | R02 | R4 |
| 0 | 0 | 0 | 1 | 0 | | | | X | | X |
| 0 | 0 | 1 | 1 | 0 | | | X | | | X |
| 0 | 1 | 0 | 1 | 0 | | X | | | | X |
| 0 | 1 | 1 | 1 | 0 | X | | | | | X |
| 1 | 0 | 0 | 1 | 0 | | | | X | X | |
| 1 | 0 | 1 | 1 | 0 | | | X | | X | |
| 1 | 1 | 0 | 1 | 0 | | X | | | X | |
| 1 | 1 | 1 | 1 | 0 | X | | | | X | |
| 0 | 0 | 0 | 0 | 1 | | X | | | X | |
| 0 | 0 | 1 | 0 | 1 | | | X | | X | |
| 0 | 1 | 0 | 0 | 1 | | | | X | X | |
| 0 | 1 | 1 | 0 | 1 | X | | | | | X |
| 1 | 0 | 0 | 0 | 1 | | X | | | | X |
| 1 | 0 | 1 | 0 | 1 | | | X | | | X |
| 1 | 1 | 0 | 0 | 1 | | | | X | | X |
| 1 | 1 | 1 | 0 | 1 | X | | | | X | |

FIG. 12b

TYPICAL READ GATE MAP - 4 BYTES ACCESSED

| | DECIMAL VALUE OF LO ORDER 3 BIT OF SAR (8 CASES COULD OCCUR) | | | | | | | | MEMORY WORD BOUNDARY | | | | ACTIVE SHIFT GATES (ACTIVE FOR BOTH ACCESSES IF REQUIRED) | | | | | | BYTE SHIFT AMT | ACTIVE INSERT 0 BYTE GATES (NOT ACTIVE ON 2nd ACCESS IF REQUIRED) | | | | | | | | ACTIVE SHIFTER LATCH BYTE SET/ RESETS (SHOWN FOR 2nd ACCESS ONLY) NOTE 1 | | | | | | | |
|---|---|---|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 0 | 1 | 2 | 3 | R01 | R1 | R2 | R3 | R02 | R4 | | 0 | 1 | 2 | 3 | 4 | 5 | 6 | 7 | 0 | 1 | 2 | 3 | 4 | 5 | 6 | 7 |
| SINGLE ACCESS ONLY | A | B | C | D | | | | | | | | | X | | | | | X | RIGHT 4 | X | X | X | X | | | | | | | | | | | | |
| | | A | B | C | D | | | | | | | | | | | X | X | | RIGHT 3 | X | X | X | X | | | | | | | | | | | | |
| | | | A | B | C | D | | | | | | | | | X | | X | | RIGHT 2 | X | X | X | X | | | | | | | | | | | | |
| | | | | A | B | C | D | | | | | | | X | | | X | | RIGHT 1 | X | X | X | X | | | | | | | | | | | | |
| | | | | | A | B | C | D | | | | | X | | | | X | | STRAIGHT | X | X | X | X | | | | | | | | | | | | |
| 2 ACCESSES REQUIRED | | | | | | A | B | C | D | | | | | | | X | | X | RIGHT 7 | X | X | X | X | | | | | | | | | | | | X |
| | | | | | | | A | B | C | D | | | | | X | | | X | RIGHT 6 | X | X | X | X | | | | | | | | | | | X | X |
| | | | | | | | | A | B | C | D | | | X | | | | X | RIGHT 5 | X | X | X | X | | | | | | | | | | X | X | X |

→ FOR ALL OF ABOVE CASES OF A 4 BYTE READ, THE FINAL DESTINATION REGISTER LOOKS LIKE → 0 0 0 0 A B C D

→ FOR THE 2 ACCESSES REQUIRED CASES, AFTER THE 1st ACCESS, THE DEST. REG LOOKS LIKE:
CASE 6 → 0 0 0 0 A B C -
CASE 7 → 0 0 0 0 A B - -
CASE 8 → 0 0 0 0 A - - -

NOTE 1: ALL SHIFTER LATCH BYTE SET 1 RESETS ARE ACTIVE DURING SINGLE ACCESS READS & THE FIRST ACCESS OF DOUBLE ACCESS READS

FIG. 14a

SHIFTING APPARATUS FOR AUTOMATIC DATA ALIGNMENT

FIELD OF THE INVENTION

The invention disclosed herein relates to data processing systems and more particularly relates to apparatus for shifting and manipulating data transferred between a central processor and its main memory.

BACKGROUND OF THE INVENTION

The present invention is directed toward a data manipulation circuit for increasing the speed with which data can be transferred in parallel multibyte units between the central processor and its main memory. This speed improvement is achieved through the ability of the apparatus disclosed to justify data accessed across memory word boundaries, through the interaction of the apparatus and microprogram control word branching.

Existing processors generally perform operations on units of data having widths which are an integral multiple of a byte. Processors generally address their main memory in the byte addressing mode. Recently, the width of the data interface between the main memory and the processor has been increasing and is now not uncommon for the width of the data interface to be 8 bytes wide. The main memory in such a system will generally be structured so that data stored therein is accessed in multibyte units called memory words, which contain the same number of bytes as are in the width of the data interface. An 8 byte memory word for example, accessed from the main memory can be directly loaded into an 8 byte wide processor register, for subsequent operations. However, the processor, in some of its operations, deals with units of information smaller than 8 bytes and when such a smaller unit of information is to be stored in the main memory, memory capacity would be wasted by allocating the smaller unit to a full 8 byte wide memory word. Thus to take full advantage of memory capacity, it has been the practice to store multibyte units of data not equal to a memory word width, so as to be packed in contiguous byte locations in the memory. These contiguously packed multibyte units of information are thus often stored across memory word boundaries. A single access of a memory word may contain only a portion of the significant information in a multibyte unit. And that portion of the information which is significant in the accessed memory word may not be in a right justified condition suitable for loading the processor register. It is seen that to access multibyte units of information lying astride the memory word boundaries require multiple memory access cycles and some means to shift the data so as to be properly justified for loading the processor register. Two principal approaches have been taken in the prior art to solve this problem.

The first approach involves a multiple access, variable length control cycle technique. To read or store multibyte information units, the prior art employs a memory microword effective for a variable number of memory cycles or control cycles. A complex three stage barrel switch is required to accomplish data shifting. Prior art requires a strobe line from the processor to the memory to signal completion of the transmission to the processor and a strobe line from the memory to the processor indicating a completion of transmission to the memory.

An alternate approach to the problem is shown in FIGS. 1*a* and 1*b* where, for the IBM System 370 Mod 145, more than two control word cycles are required to read or store multibyte data units across memory word boundaries. In this approach no specialized hardware is used.

FIG. 1*a* shows sequence of microprogramming control word steps necessary to execute the data alignment function in a read access in the existing IBM System 370 Mod 145 Data Processing System. The existing Mod 145 System executes the data alignment functions completely under the control of microprogramming control words. In the case illustrated, the data interface is 4 bytes wide and each memory word is 4 bytes in width. The processor contains data register 1 and data register 2 into which is to be loaded a 4 byte unit of information from the memory. After the processor has executed the previous microword 2, the read access microword 4 is executed, causing the processor to access the contents of memory word 1 and directly load it into processor register 1. In case 1, the 4 byte unit of information completely lies within the memory word 1 and no further steps are required in the data alignment. The processor recognizes this condition by branching on the two low order address bit in the storage address register. Case 1 corresponds to the 4 byte unit of information completely lying within the memory word 1. Thus, the two low order address bits are 00 and the processor thus branches to the next microword Y6. In case 2, not all of the bytes stored in the memory word 1 are significant with respect to the 4 byte information unit to be accessed, the last byte D being located in memory word 2. The processor thus branches from the read access microword 4 to the sequence of microwords 8, 10 and 12 which successively shift the position of the respective bytes of significant information to the left by one unit in register 1. The processor then branches to the second read access microword 20 which accesses memory word 2 and directly loads the contents thereof into the processor register 2. The processor again branching on the original two low order address bits, branches to microprogram words 22 which shifts the contents of byte 0 and register 2 to the byte 3 position in register 1 thereby completing the alignment justification of the 4 byte unit of information stored across the memory word boundary between memory word 1 and memory word 2. The processor then branches to the next general microword Y6 to be executed. It is seen that although it works well for its intended purpose, this prior art approach to data alignment employing no specialized hardware but only microprogram control words requires as many as 6 microprogram control word cycles to accomplish the justified alignment of a multibyte data field stored across a memory word boundary in the main memory. Similar sequences of microprogram control word steps for write accessing in the existing model 45 system are shown in FIG. 1*b*.

OBJECTS OF THE INVENTION

It is an object of the invention to increase the efficiency of transfer of multibyte data fields between a processor and its main memory.

It is an additional object of the invention to enhance the efficiency of multibyte data transfer without unduly adding to the complexity of the hardware in the processor.

It is another object of the invention to access multibyte data fields across memory word boundaries without the necessity of employing strobe lines between the processor and its main memory to indicate the termination of an access.

It is still another object of the invention to access multibyte data fields across memory word boundaries in two or less control word cycles, in an improved manner.

SUMMARY OF THE INVENTION

The above objects are accomplished by the improved multibyte data shifting apparatus disclosed herein. The apparatus is used in a microprogram controlled data processing system to efficiently shift a multibyte data field. The data field is accessed from a structured memory where it is stored across the boundary between a first and a second memory word. The accessed data field is then loaded right justified into a processor register. The shifting apparatus is responsive to a first microprogram control word specifying the multibyte data field length, to shift a first plurality of bytes accessed from the first memory word and to load it into a processor register in a shifted position. The position is shifted such that the total multibyte field to be accessed will be justified in the register. The amount of the shift is determined by a binary adder operating on the low order bits of the storage address and the field length data. The binary adder generates a carry output which indicates that the multibyte field accessed lies across a memory word boundary. The carry output is connected to a branching unit in the microprogram controller causing the controller to branch to a second microprogram control word. The shifting apparatus is then responsive to the second microprogram control word to shift a second plurality of bytes as the remaining portions of the multibyte field, accessed from the second memory word. The second plurality of bytes is then loaded justified in the processor register. The multibyte data field is thereby accessed and justified in no more than two control word cycles through the cooperation of microcontrol words and simplified hardware. The system does not require the use of strobe lines between the processor and the memory to indicate the termination of an access.

DESCRIPTION OF THE DRAWINGS

The foregoing and other objects, features and advantages of the invention will be apparent from the following more particular description of the preferred embodiment of the invention, as illustrating by the accompanying drawings.

FIG. 12*b* is the truth table for the shift gate decoder.

FIG. 14*a* is a read gate map which illustrates the operation of the invention for the read access of a 4 byte field.

DISCUSSION OF THE PREFERRED EMBODIMENT

Figure 1A:
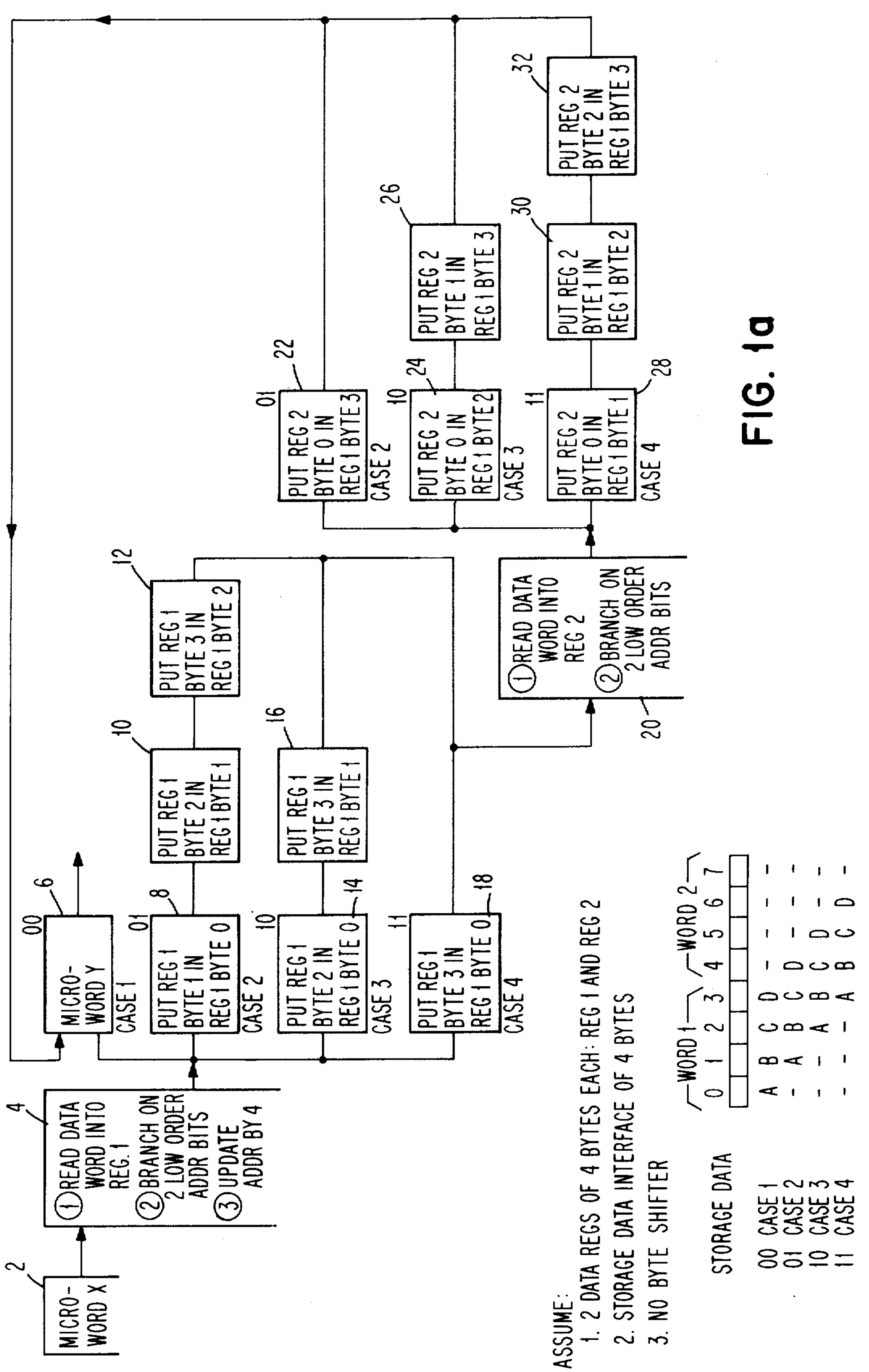
FIG. 1*a* shows the sequence of microprogram control word steps necessary to perform a read access in the existing IBM System 370 Mod 145 Data Processor.
Figure 1B:
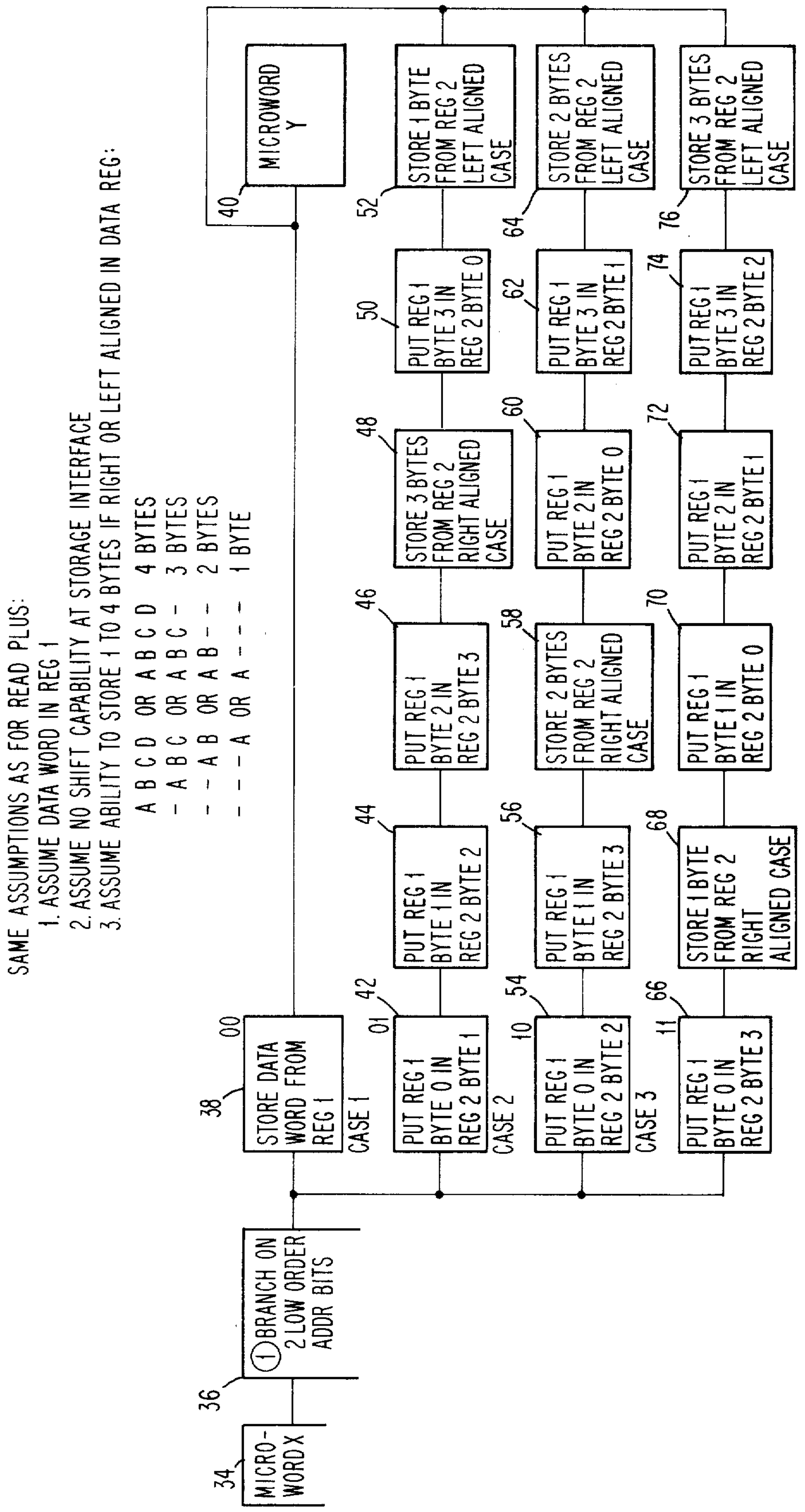
FIG. 1*b* shows the sequence of microprogram control word steps necessary to perform a write access in an existing IBM System 370 Mod 145 Data Processor.

The preferred system illustrated in the drawings are an improvement over that shown in U.S. Pat. No. 3,400,371, issued Sept. 3, 1968, to G. M. Amdahl, et al., and assigned to the instant assignee, and includes microprogram routines to control hardware for executing macroinstructions generally of the type described in the Amdahl patent.

Before describing the preferred embodiment, a definition of certain terms to be used herein will be made. Data is arranged primarily on a memory word basis, each memory word comprising 8 bytes. Each byte is comprised of 8 binary data bits and a parity check bit. Data is accessed and transferred between the data processor and the memory in memory word units. It should be recognized, however, that the shifting invention disclosed is equally as applicable to a memory organization having $2^n$ bytes per memory word, where $n$ is an integer.

Figure 3:
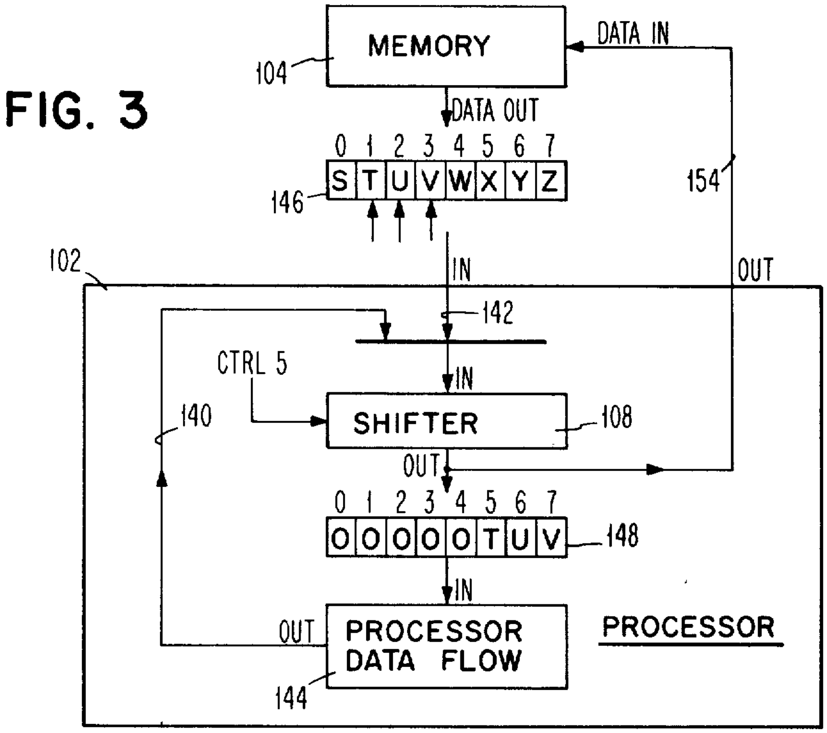
FIG. 3 is a simplified diagram of the data flow through the shifter invention on a memory read access.
Figure 4:
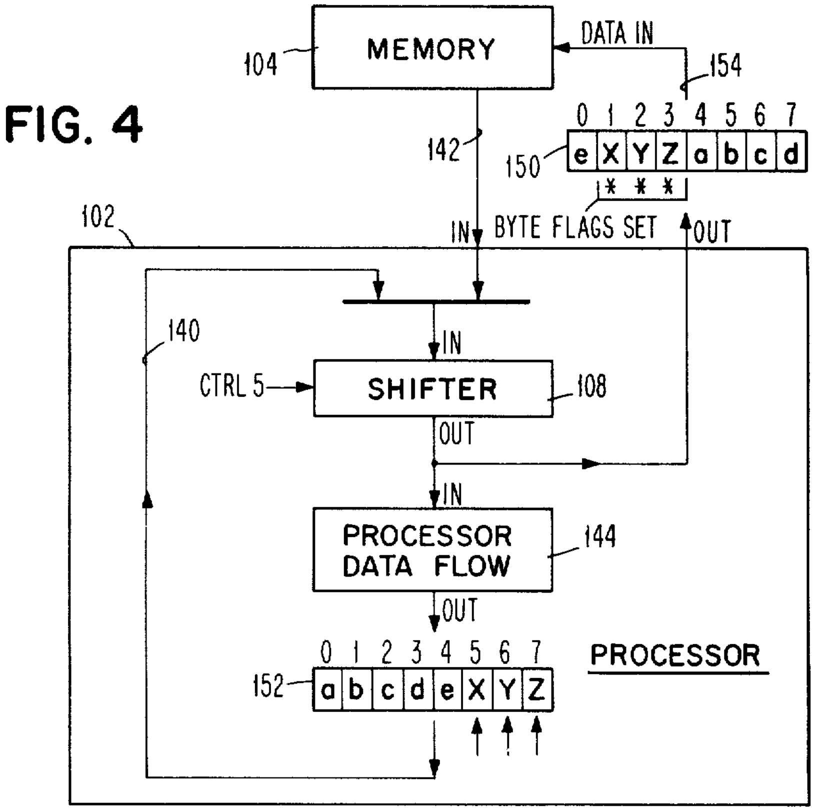
FIG. 4 is a simplified diagram of the data flow through the shifter invention on a memory write access.

FIG. 3 is a simplified diagram of the data flow through the shifter invention on a memory read access. FIG. 4 is a simplified diagram of the data flow through the shifter invention on a memory write access. A basic principal of the invention disclosed is that a shifter be used as the focal point for data transmission between the processor and its main memory and that the shifter be driven by hardware controls which cooperate with microprogram control words in a manner so as to enhance efficiency without unduly adding to the complexity of the hardware. The controls are such that data is automatically aligned and formatted as it becomes necessary in its transfer to or from the memory. FIG. 3 shows that on a memory read, the significant bytes of those read from the memory and present on the source bus 142 are right aligned when they appear in the output of the shifter 108.

FIG. 4 illustrates that on a memory store, those bytes of data to be written, are placed into the proper byte slot locations by the shifter 108 and proper byte flags are turned on indicating which byte positions of the storage word in question are to be written. The shifting apparatus shifts information present on its input bus any number of byte lengths right or left, and latches the result in its output register 108. The apparatus is designed to format the output as indicated by the microprogram control word. The apparatus is automatically able to align and format data and thus extra firmware cycles required by the prior art as being necessary for data alignment on every read or store request are no longer necessary. In the subject invention, one microword is issued for each memory word that has to be accessed. The apparatus can detect the condition of a multibyte information unit which lies across memory word boundaries and will cause a microprogram branch to occur so that a second microprogram control word can be executed to access the balance of the multibyte information unit desired. These functions are automatically performed by the apparatus disclosed.

The present invention is directed to improving the efficiency in multibyte data transfers between the main memory and the processor units. A basic feature of the invention disclosed is the sharing of control functions between microprogram control words and data shifting hardware. It is this cooperation between the microprogram control words and the apparatus disclosed, which enhances the efficiency of multibyte data transfers without unduly adding to the complexity of the hardware in the data processor.

Figure 2A:
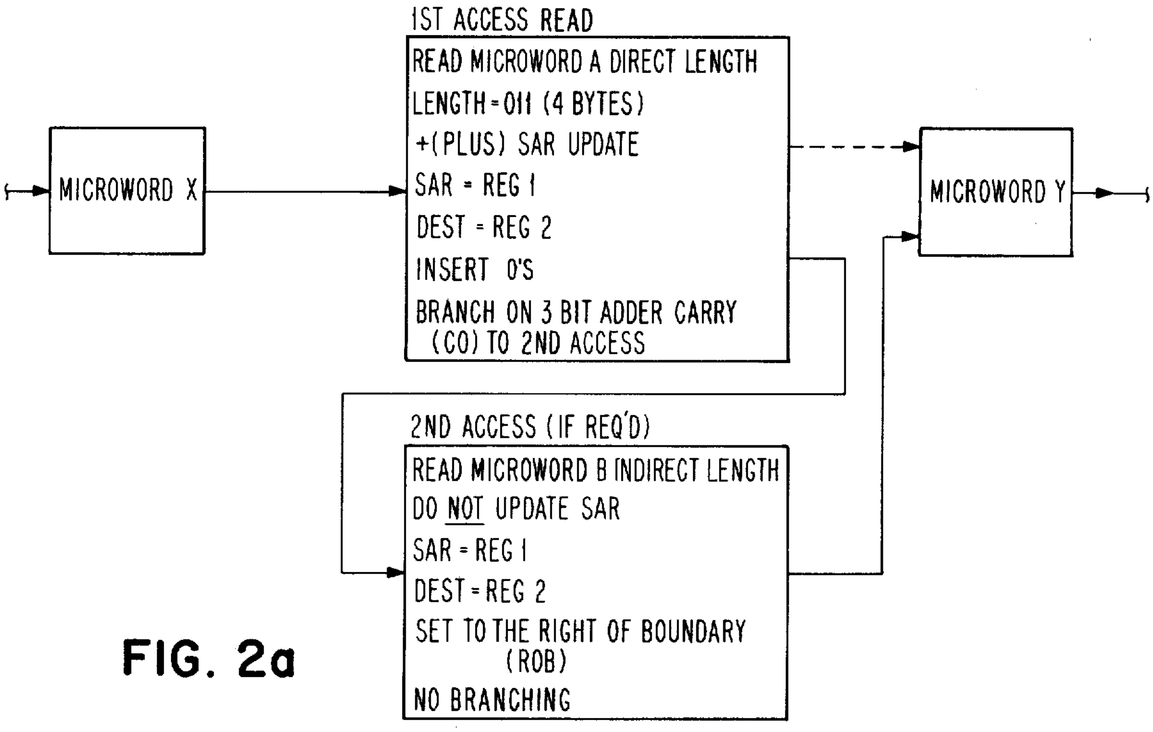
FIG. 2*a* shows the sequence of microprogram control word steps necessary to carry out a read access with the improved shifting apparatus for automatic data alignment invention.
Figure 2B:
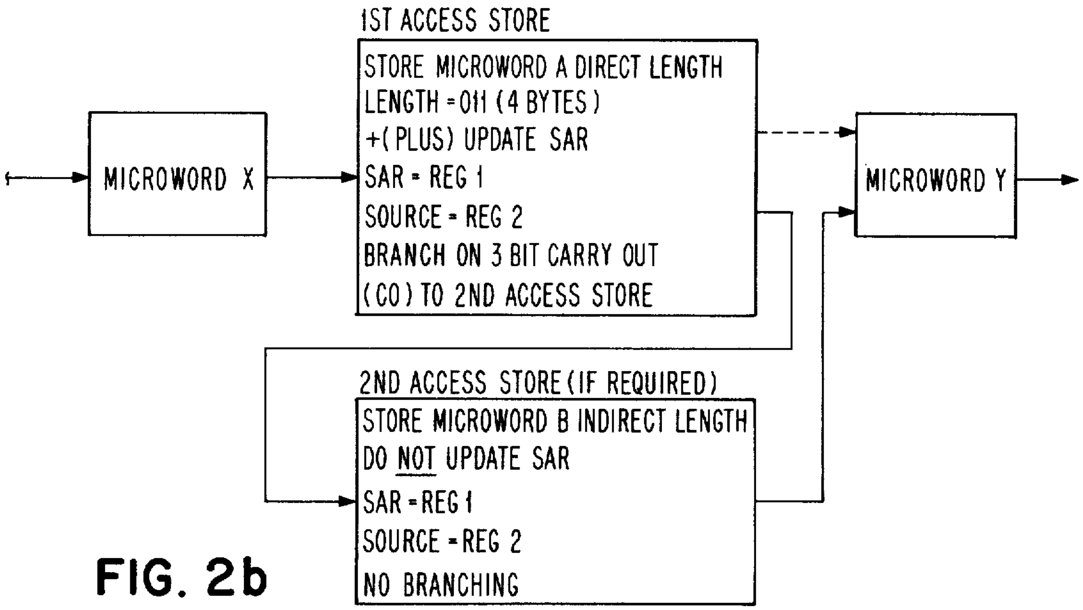
FIG. 2*b* shows the sequence of microprogram control word steps necessary to carry out a store access when employing the improved shifting apparatus for automatic data slignment invention.

The sequence of microprogram control word steps necessary to accomplish a read access with the shifting apparatus disclosed, is shown in FIG. 2*a* and the sequence of microprogram control word steps necessary to execute a store access with the shifting apparatus disclosed and shown in FIG. 2*b.* It is noted that the number of control word cycles necessary to complete a multibyte data transfer which may lie across a memory word boundary, is no more than two control cycles.

Figure 5:
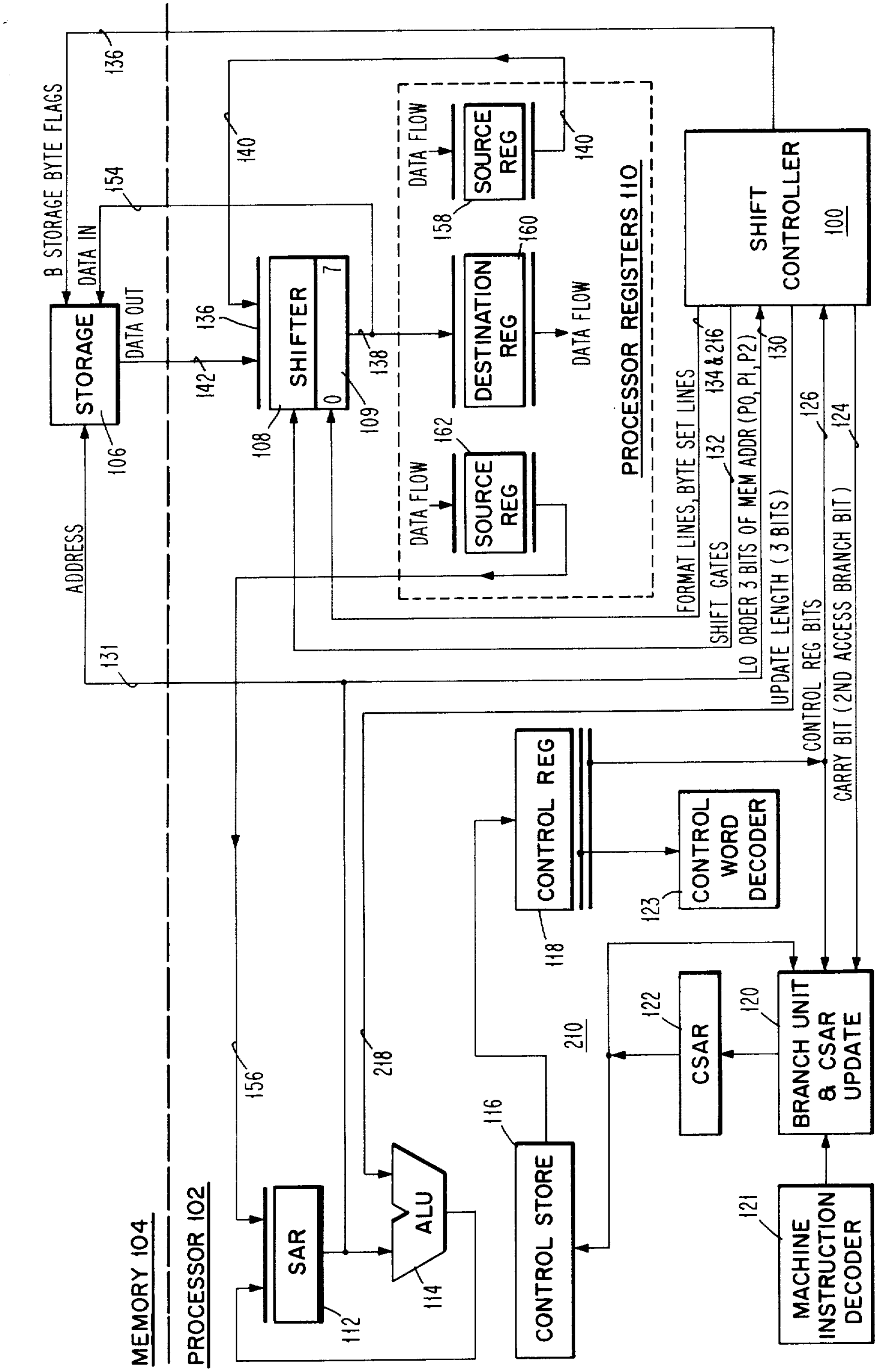
FIG. 5 is a system block diagram of the data processor which contains the shifting apparatus for automatic data alignment control.

FIG. 5 is a system block diagram showing the data processor 102 connected to the main memory 104 by the read data bus 142 and the write data bus 154. The contents of memory words addressed by storage address register 112, are outputted from the memory 104 over the read data bus 142 into the shifter 108 which, under the control of the shift controller 100 and the microprogram control word stored in the control register 118, automatically aligns the accessed multibyte data unit and loads the same into the destination register 160 for further processing in the data flow. On a storage access, data right justified in the source register 158, is loaded into the shifter 108 which, under the control of the shift controller 100 and the microprogram control word in control register 118, shifts the multibyte data unit and then loads the shifted data unit by means of the store data bus 154 into the memory word in the memory 104, accessed by the storage address register 112. The shift controller 100 determines whether a second access of the memory is required to complete the automatic data alignment function by testing for the presence of a carry output from a three bit binary adder 200 shown in greater detail in FIG. 6.

Figure 6:
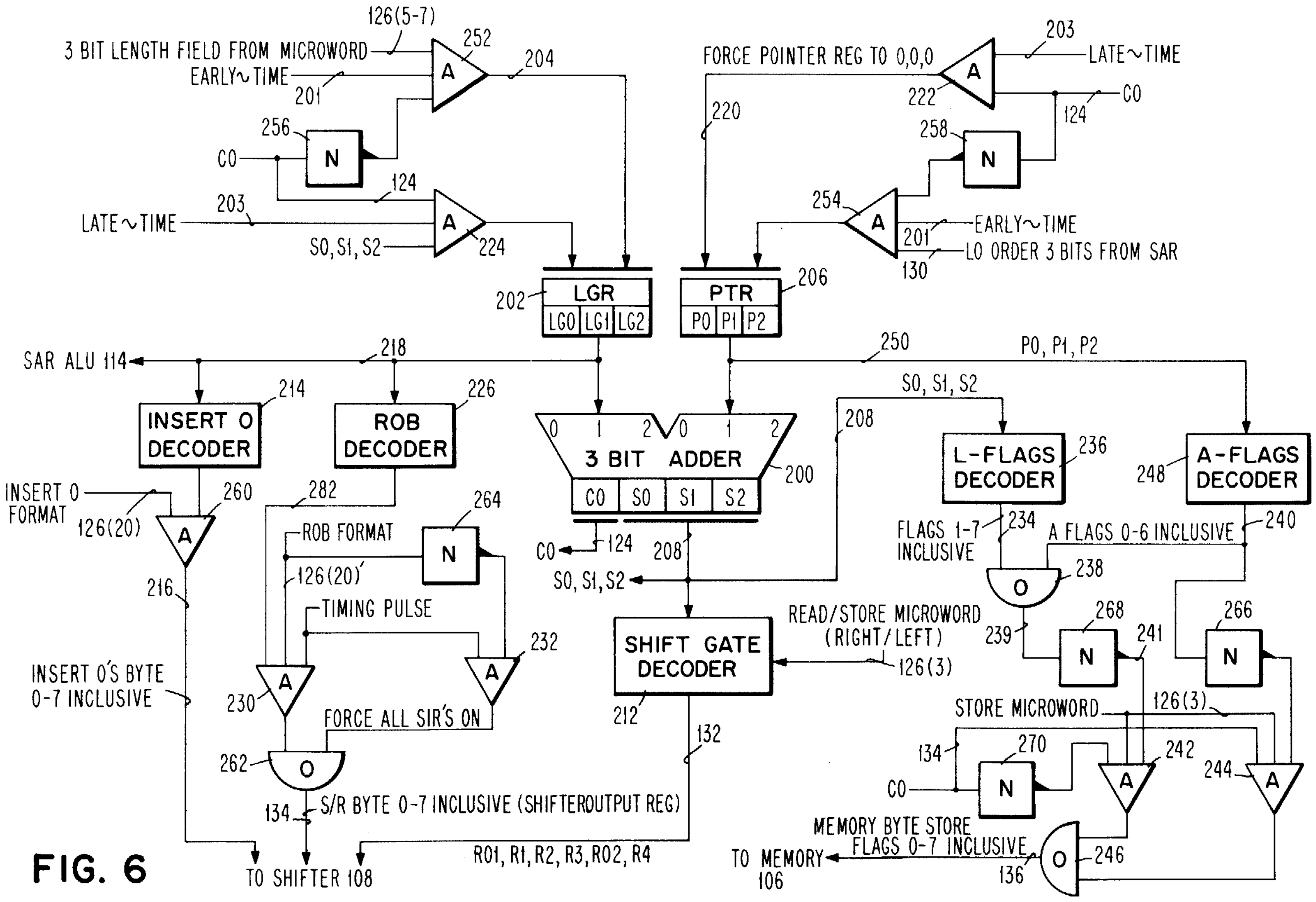
FIG. 6 is a logic diagram of intermediate detail showing the shift controller 100.

FIG. 6 is a more detailed logic diagram of the shift controller 100. The length register 202 is a three bit wide register containing the length field, LG which is byte length oriented. If a memory word width is $2^n$ then the length register would contain n bits. The bit positions of the length register 202 are defined as LG0, LG1, LG2 respectively, where LG0 is the high order bit. The function of the length register 202 is to store the binary value of one less than the number of bytes to be accessed from the memory. The length register 202 is loaded either by an explicit amount on line 204 from a field 5-7 in the microprogram contol word shown in FIG. 13, or by an implicit amount under the control of hardware when a memory word boundary has been crossed. This implicit setting will be described later. The contents of the length register 202 is one of the inputs to the three bit binary adder 200.

The pointer register 206 is a three bit wide register which ordinarily contains the low order three bits in the storage address register 112 loaded on input line 130. Where a memory word width is $2^n$ bytes, the low order n bits in the storage address register 112 will be loaded into the pointer register 206. The storage address register 112 contains the storage address of interest, expressed in binary. The binary value of the contents of the pointer register 206, can be considered a byte address as opposed to a memory word address. The contents of the pointer register 206 points to one of the 8 bytes, 0 through 7 contained in the memory word of interest. The memory word of interest is identified by the binary value of the remaining high order bits in the storage address register 112, which are outputted on line 131 to access the corresponding memory word in the memory 104. The contents of the pointer register 206 is the augend input to the three bit adder 200. The pointer register bits are defined as P0, P1, and P2 respectively where P0 is the high order bit.

The three bit binary adder 200 has sum field bits S0, S1, and S2 which are the output bits of the three bit, two input binary adder. S0 is the high order bit. The result of adding the pointer field in the pointer register 206 to the length field in the length register 202 through the three bit adder 200, is to create an adder output as the sum bits S0, S1, and S2 on line 208 which can be decoded to give the proper byte shift control signal to the shifter 108. The shifter 108 can then automatically align the 8 bytes of data being transmitted between the storage 106 and the processor 102. Table I illustrates the sum bit decode map which gives the proper shift controls.

All of the shifts shown in Table I imply a wrap where the low order bytes are wrapped into the high order byte positions on a right shift and high order to low order for a left shift.

Figure 12A:
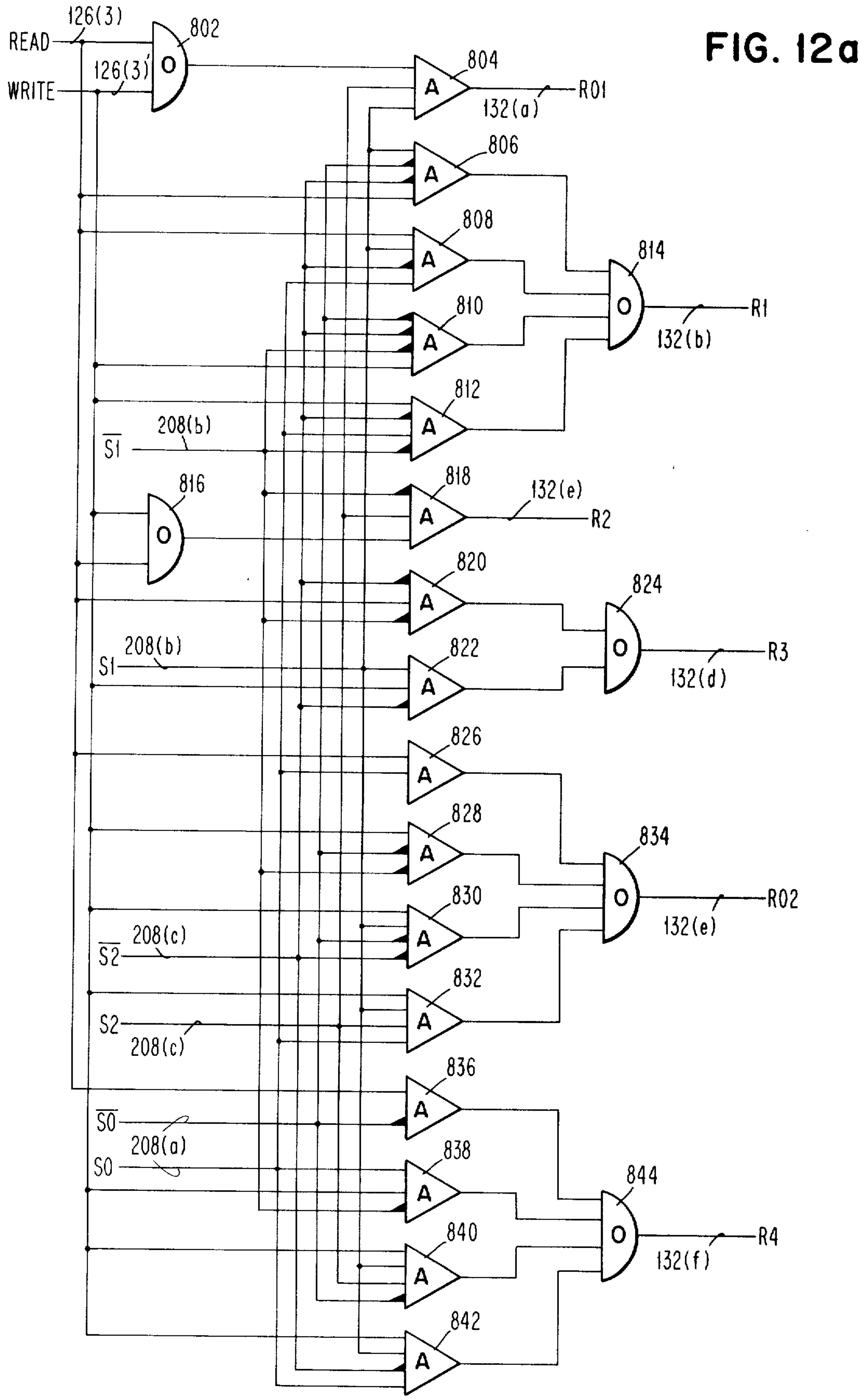
FIG. 12*a* is a detailed logic diagram of the shift gate decoder 212.

The sum bits S0, S1 and S2 output on line 208 from the three bit adder 200, are decoded in the shift gate decoder 212, a more detailed illustration of which appears in FIG. 12*a* and the truth table of which appears in FIG. 12*b.* The output from the shift gate decoder 212

TABLE I

Figure 7:
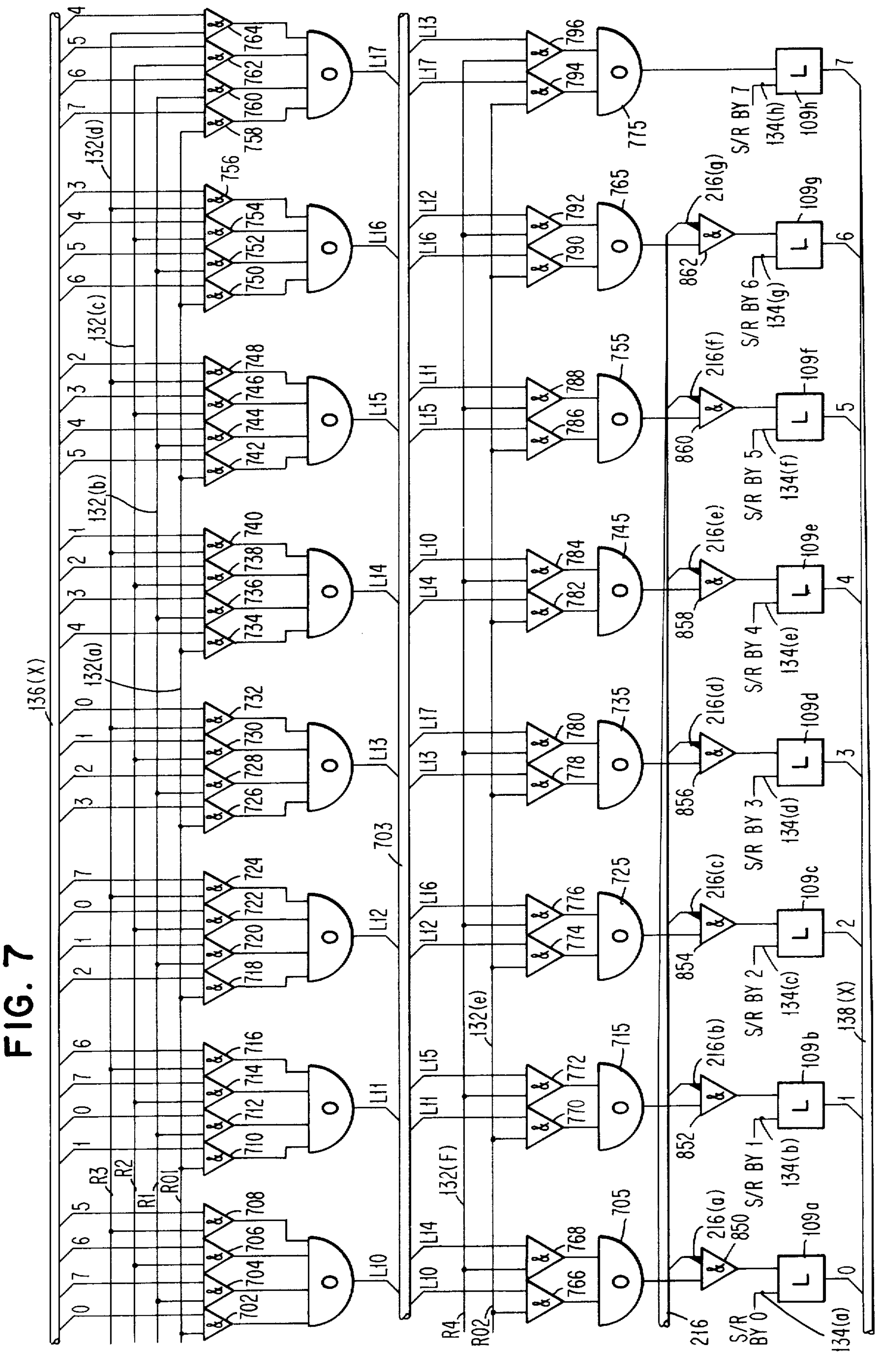
FIG. 7 is a detailed logic diagram of an 8 byte wide byte shifter 108, to shift the xth bit location in each of eight bytes.

S0, S1 & S2 Decode to Give Proper Shift Controls:

| Value of Each Sum Bit | | | Decimal Value of Sum Bits | Shift Amount on: Storage Read | Storage Write |
|---|---|---|---|---|---|
| S0 | S1 | S2 | | | |
| 0 | 0 | 0 | 0 | Shift Right 7 bytes | Shift Left 7 bytes |
| 0 | 0 | 1 | 1 | Shift Right 6 bytes | Shift Left 6 bytes |
| 0 | 1 | 0 | 2 | Shift Right 5 bytes | Shift Left 5 bytes |
| 0 | 1 | 1 | 3 | Shift Right 4 bytes | Shift Left 4 bytes |
| 1 | 0 | 0 | 4 | Shift Right 3 bytes | Shift Left 3 bytes |
| 1 | 0 | 1 | 5 | Shift Right 2 bytes | Shift Left 2 bytes |
| 1 | 1 | 0 | 6 | Shift Right 1 byte | Shift Left 1 byte |
| 1 | 1 | 1 | 7 | No Shift | No Shift |

is conducted over liner 132 to the shifter 108. A detailed illustration of the eight byte wide shifter 108 is illustrated in FIG. 7.

Figures 10A, 10B:
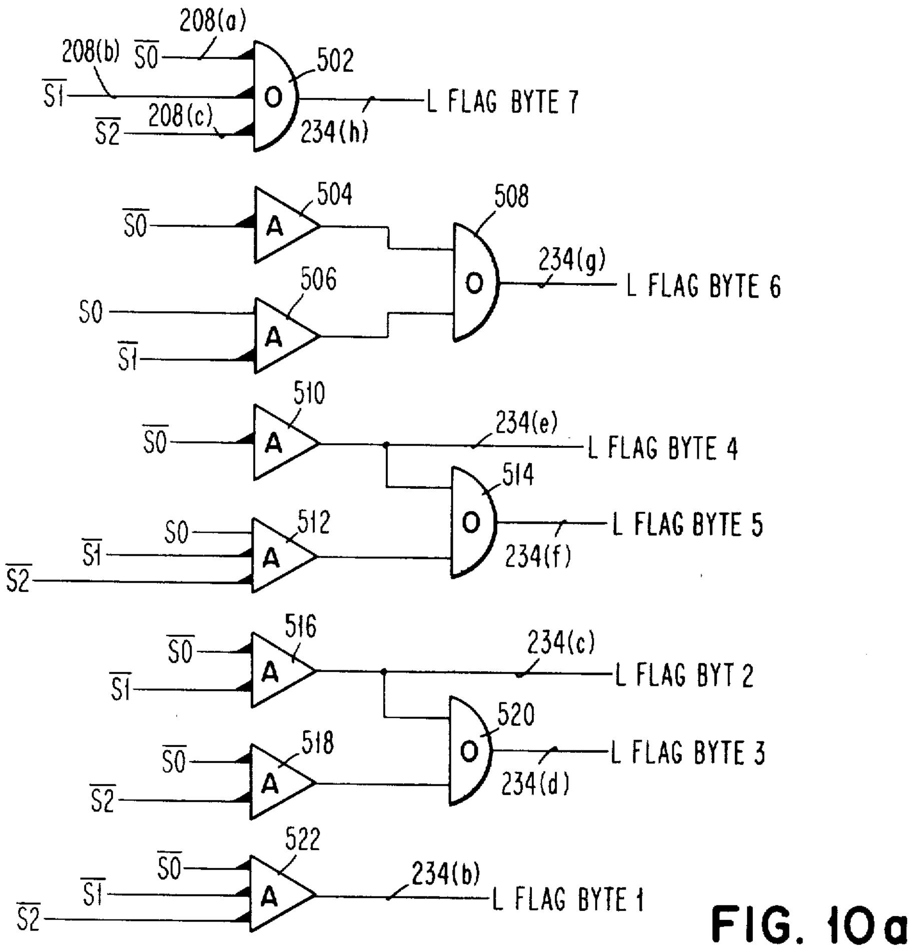
FIG. 10*a* is a detailed logic diagram of the L-flag decoder 236.
FIG. 10*b* is the truth table for the logic in the L-flag decoder.
Figures 11A, 11B:
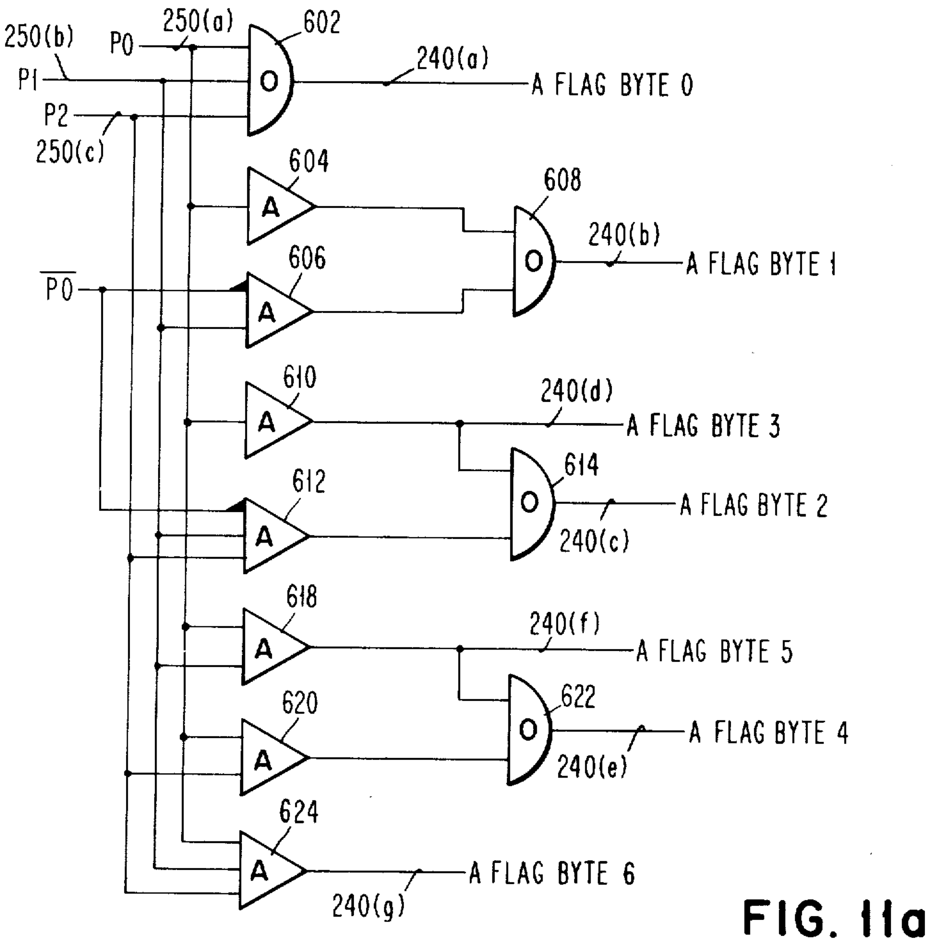
FIG. 11*a* is a detailed logic diagram for the A-flag decoder 248.
FIG. 11*b* is the truth table for the logic in the A-flag decoder.

On a read access, it is generally desirable that those byte positions of the memory word which contain insignificant data be "zeroed out." This permits the processor to directly perform arithmetic normal and logical operations on the bytes of interest which are loaded into the processor register 160, without first having to isolate the significant bytes in the access data field. An insert zero decoder 214 has an input connected by means of line 218 to the length register 202, functions to automatically insert zeros in those byte positions having insignificant data fields. When field 20 of the microprogram control word shown in FIG. 13 has its bit set to zero the output of the insert zero decoder 214 is enabled by the AND gate 260 and the resulting signals on line 216 serve to disable those output latches 109 in the shifter 108 which correspond to insignificant byte positions.

Where a multibyte data unit is shorter than the memory words of storage, it is seen that the data on all eight lines of the data interface cannot be used in its entirety to replace the contents of the existing memory word. Thus, byte flag information must be sent to the memory to indicate which of the eight byte locations in the access memory word, are to be loaded. The L-flag decoder 236 which is connected to the output line of a three bit adder 200 and the A flag decoder 248 which is connected to the pointer register 206, accomplish the byte flag functions. The A flag decoder logic is illustrated in FIG. **11*a* and its corresponding truth table is illustrated in FIG. 11*b*. The L flag decoder is illustrated in FIG. 10*a* and the corresponding truth table is illustrated in FIG. 10*b*.**

Figures 9A, 9B:
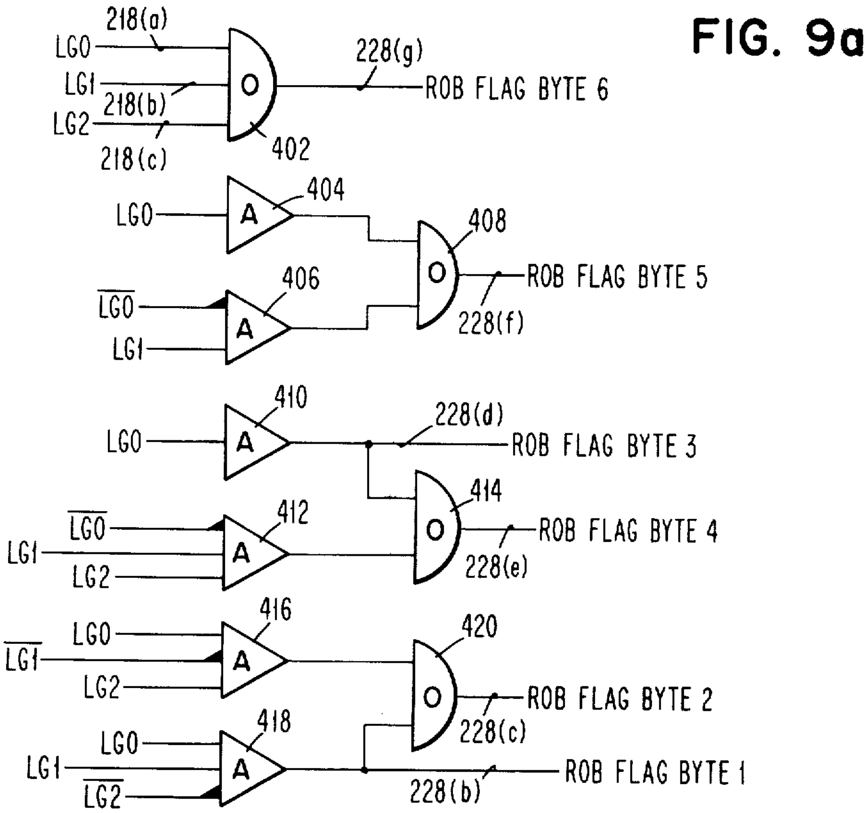
FIG. 9*a* is a detailed logic diagram of the right of boundary flag decoder 226.
FIG. 9*b* is the truth table for the logic in the right of boundary flag decoder.
Figure 13:
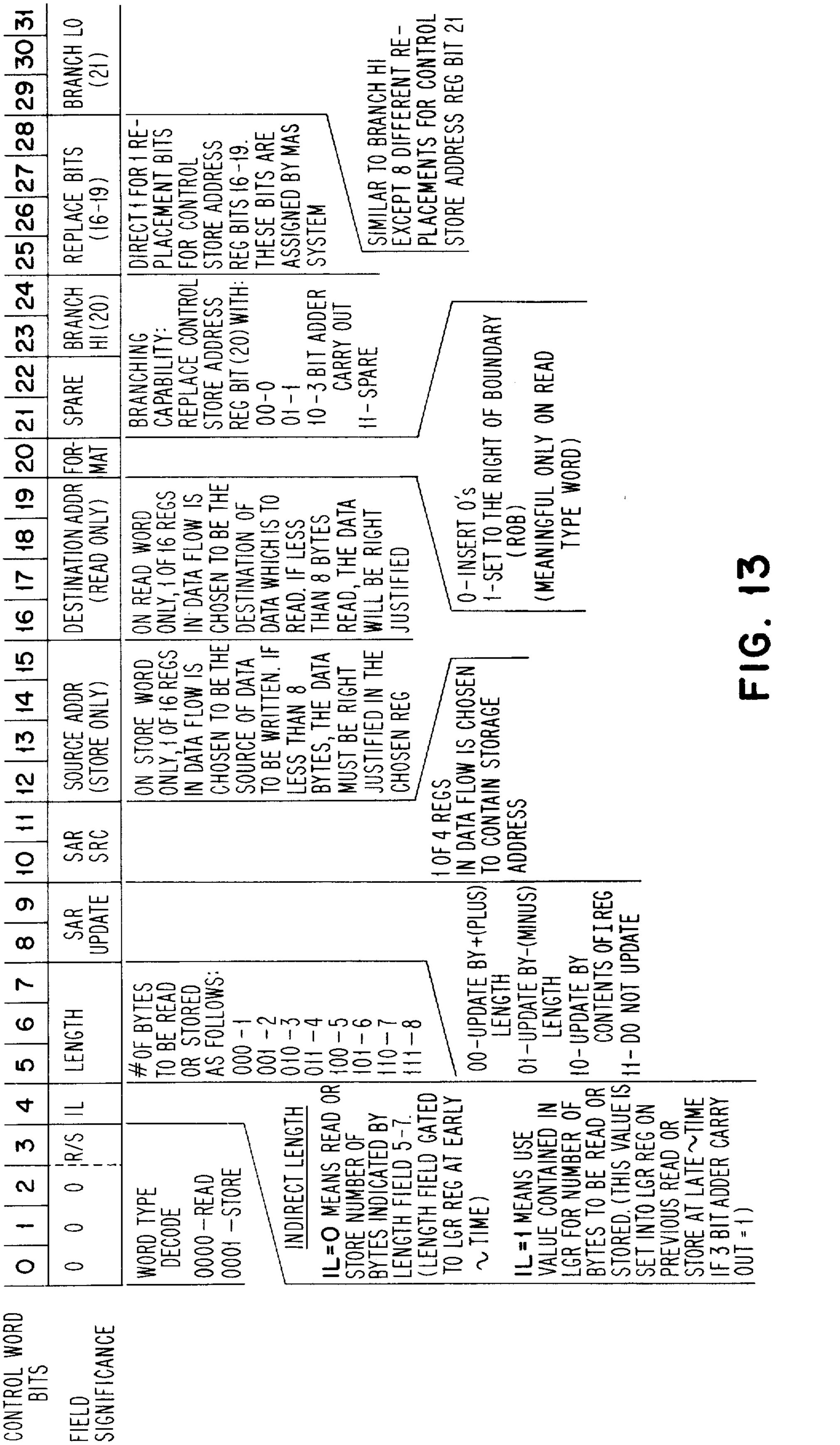
FIG. 13 illustrates the format for the microprogram control word controlling a read or a store access of the main memory by the processor.

Two memory accesses are required when the contents of the pointer register 206 associated with the starting address and the number of bytes specified in the length field 5–7 of the microword of FIG. 13, indicate that the bytes of interest occupy two adjacent memory words. A carry bit Co will be present on line 124 from the three bit adder 200 which indicates that a memory word boundary has been crossed and that two storage accesses will be required. During each machine read or store cycle (where the branch high field 23–24 of FIG. 13 equals 10), the branch unit 120 of the control unit 210 in FIG. 5 checks to determine whether another access will be required to transfer all of the bytes of interest. It does this by detecting a carry out condition on line 124 from the three bit adder 200, whose output is always the sum of the pointer 206 and the length field 202. If the carry out is detected then AND gate 222 will force the pointer register 206 to contain all zeros and AND gate 224 will cause the length register 202 to be loaded with the sum bits outputted on line 208 from the three bit adder 200. At this point the storage address in the storage address register 112 is updated by the ALU 114 explicitly through an update field 8–9 in the microprogram control word of FIG. 13. The branch unit 120 of the microprogram controller 210 detects the carry bit CO from the three bit adder 200. If fields 23 and 24 of the microprogram control word of FIG. 13 contain a 10, a microprogram control word branch will be permitted allowing the issuance of a second B-type microprogram control word. The B-type control word will call for an implicit byte length and on the read access, field 20 will call for a special formatting function to be performed (set to the right of boundary) so that the second portion of the multibyte data unit being accessed will be properly loaded to the right of the first portion accessed and loaded in the processor register. When the right of boundary condition is specified, the data alignment control hardware 100 allows only those byte positions in the shift output register 109 to the right of a particular byte position, to be altered. The particular byte positions are decoded from the length field, register 202 by means of the right of boundary decoder 226. A detailed logic diagram of the right of boundary decoder 206 is shown in FIG. **9*a* and a corresponding truth table is shown in FIG. 9*b*. Signals are outputted from the right of the boundary decoder 226 over line 134 enable only selected output latches 109** which are situated to the right of those latches previously loaded with significant information from the first memory word accessed, to be loaded.

OPERATION OF THE INVENTION

Four examples of the operation of the shifting apparatus invention will be given to illustrate a read access for a multibyte information unit contained wholy within a memory word, a write access for a multibyte information unit contained wholy within a memory word, a read access where the multibyte information unit lies across the memory word boundary, and a write access where the multibyte information unit lies across a memory word boundary.

Read Access Within Single Memory Words

A machine instruction decoder 121 of FIG. 5 requires a read access of four bytes of information starting at memory location 488. In FIG. **2*a*, the previous microword X has just been executed and the control storage address register update 120 causes the control storage address register 122 to access from the control storage 116** the read microword A which is shown in FIG. 15*b*. (Reference to the microword format FIG. 13 may be of assistance.) A zero in field 3 indicates a read access. A zero in field 4 indicates that the number of bytes is indicated by the length field 5–7. Field 5–7 is the length field and is the binary value of one less than the magnitude of the number of bytes to be accessed from the memory. Field 8–9 indicates that the storage address register is to be updated by the length of the multibyte information unit accessed. Field 10–11 indicates which source register 162 in the processor contains the storage address. Field 16–19 indicate which destination register 160 in the processor is to be loaded with the multibyte data unit accessed. Field 20 contains a zero and indicates that the insert zero masking function is to be executed. Field 23–24 contains a one and zero indicating that if a carry out bit C0 is detected on line 124, that the branch unit 120 is to branch to the B-read microprogram control word.

The zero in field 4 of the A-read microprogram control word of FIG. 15*b* causes the length data in the field 5–7 to be loaded into the length register 202. The field 10–11 of the A-read control word causes the contents of the source register 162 to be loaded into the storage address register 112 as the storage address for the memory word to be accessed in storage 106. The low order three bits in the storage address register, namely 000, are loaded into the pointer register 206. The contents of the memory word 488 is shown in Table II.

TABLE II

| | | | | | | | | |
|---|---|---|---|---|---|---|---|---|
| Byte Positions of Word | ϕ | 1 | 2 | 3 | 4 | 5 | 6 | 7 |
| Value of Contents of Bytes | W | X | Y | Z | e | f | g | h |

From the starting address and the length as issued by the read microword in the control register 118, it is seen that the byte positions 0, 1, 2 and 3 containing the data bytes W, X, Y and Z respectively, are of interest. It is desired to have these bytes right aligned by the shifter 108. The contents of the pointer register 206 and the length register 202 are added in the three bit adder 200 yielding a sum 011 with no carry out C0 of the three bit adder. The sum field of 011, in conjunction with the A-read microword, will cause the contents of the memory word 488 to be shifted right four bytes and latched in the shifter output register 109, as is shown in Table III.

TABLE III

| | | | | | | | | |
|---|---|---|---|---|---|---|---|---|
| Shifter Output Reg. Byte Positions | ϕ | 1 | 2 | 3 | 4 | 5 | 6 | 7 |
| Value of Contents of Bytes | e | f | g | h | W | X | Y | Z |

Figure 14B:
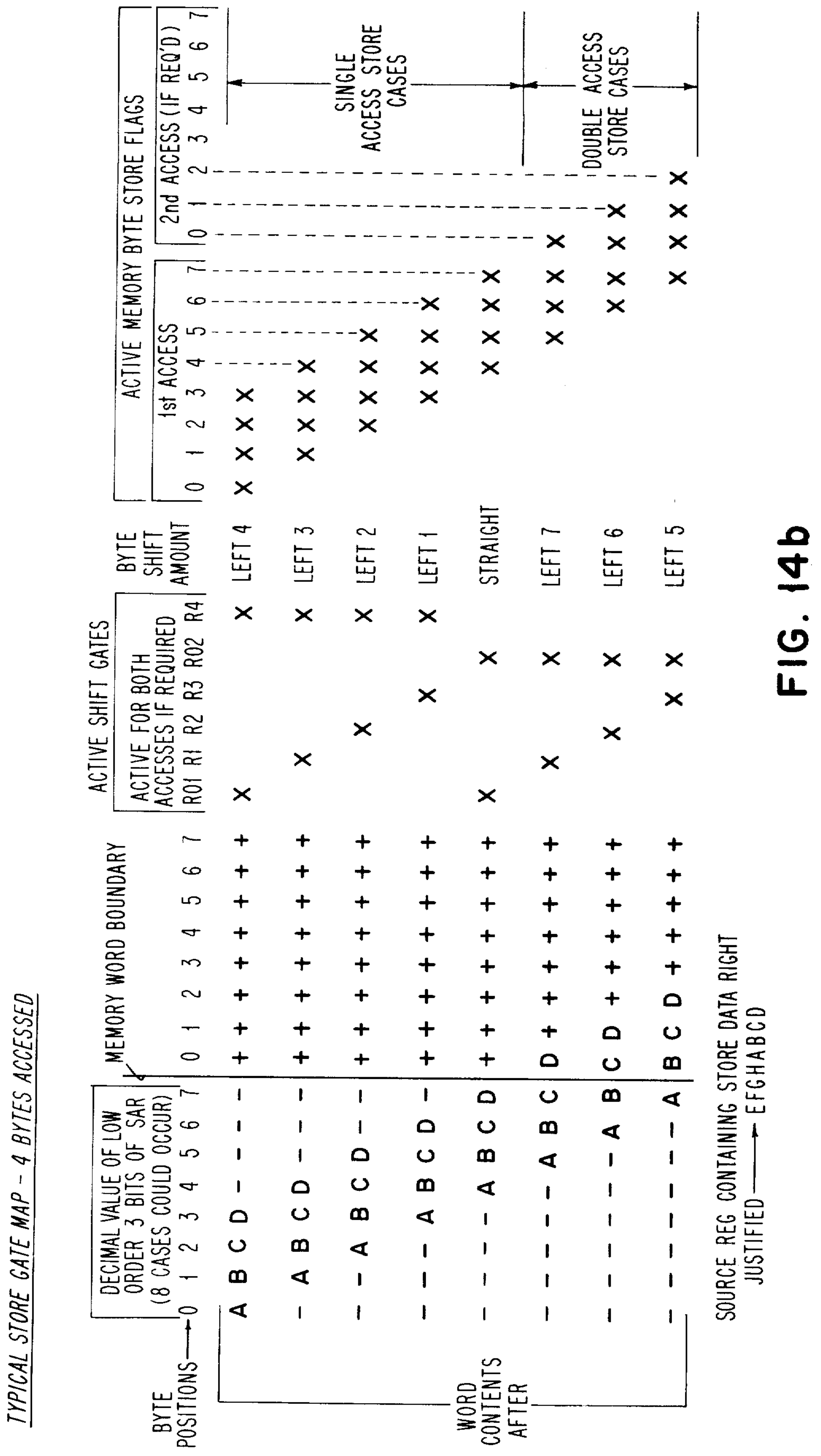
FIG. 14*b* is a store gate map illustrating the operation of the invention for the storage access for a 4 byte field.

The sum bit S0 = 0, the sum bit S1 = 1 and the sum bit S2 = 1. The carry bit C0 = 0. Line 208 carrys the sum bit signals to the shift gate decoder 212 shown in FIG. 12*a*. The OR 802 and the AND 804 are enabled thereby generating a one bit signal on the R01 line 132*a*. The AND gate 836 and the OR gate 844 are enabled thereby generating a one bit signal on the R4 line 132(*f*). The R01 line 132(*a*) and the R4 line 132(*f*) are input into the shifter 108 shown in FIG. 7. The read gate map of FIG. 14*a* shows the location of the active gates in the decoder 212.

FIG. 7 is a detailed logic diagram of the eight byte wide byte shifter 108, necessary to shift the Xth bit location in each of eight bytes. The complete byte shifting apparatus would include nine of the circuits shown in FIG. 7 in order to accomplish the shifting of bytes containing eight bits plus a parity bit. The contents of the memory word 488 having been accessed from the storage 106 is input to the data shifter 108 over the memory data out line 142 and the input shifter bus 136. The portion of the input shifter bus 136(*x*) containing the Xth bit for each of the eight bytes 0 through 7, is shown in FIG. 7. The Xth bit line for each of the numbered bytes is shown input to the AND gate 702–764. The first stage decode lines R01-3 are shown input respectively to selected ones of the AND gate 702-764 therefore selectively switch the Xth bit of the numbered bytes as the first stage of switching and outputs the selected bits over the line L10-L17 to the level one out bus 703. For byte zero, the Xth bit is gated from shifter input bus 136(*x*) through the AND gate 702 yielding a signal on line L10, accomplishing the first stage of byte shifting. The lines L10-L17 are connected from the level 1 output bus 703 to selected AND gates 766-796. The selection line R4 and R02 are also connected to selected AND gates 766-796. The AND gate 766-796 can thus selectively switch the lines L10-L17 thereby accomplishing the second level of byte shifting. For the byte zero, the L10 line from the level 1 output bus 703 is gated through the AND 784 and the OR 745 and is directed to the latch 109(*e*) for the byte position 4.

The Xth bit for byte 1 is switched in a similar fashion being directed from the input bus 136(*x*) through the AND gate 710 onto the line L11, over the level 1 output bus 703 to the AND gate 788 and the OR gate 755 thereby being directed to the latch 109(*f*), corresponding to bytes 5.

In a similar fashion byte 2, the Xth bit is gated through AND 718 over line L12 and through AND 792 to latch 109(*g*) corresponding to byte number 6. And lastly for byte 3, the Xth bit is gated through AND 726, over line L13, and through AND 796 to latch 109(*h*) corresponding to byte 7.

The operation of the shifter shown in FIG. 7 is essentially a wrap of the data on the shifter input bus 136(*x*) to the data on the output latches 109. For example, the Xth bit in byte 4 will be directed through AND 734, over line L14 and through AND 768 to latch 109(*a*) and the zero byte position.

Figures 8A, 8B:
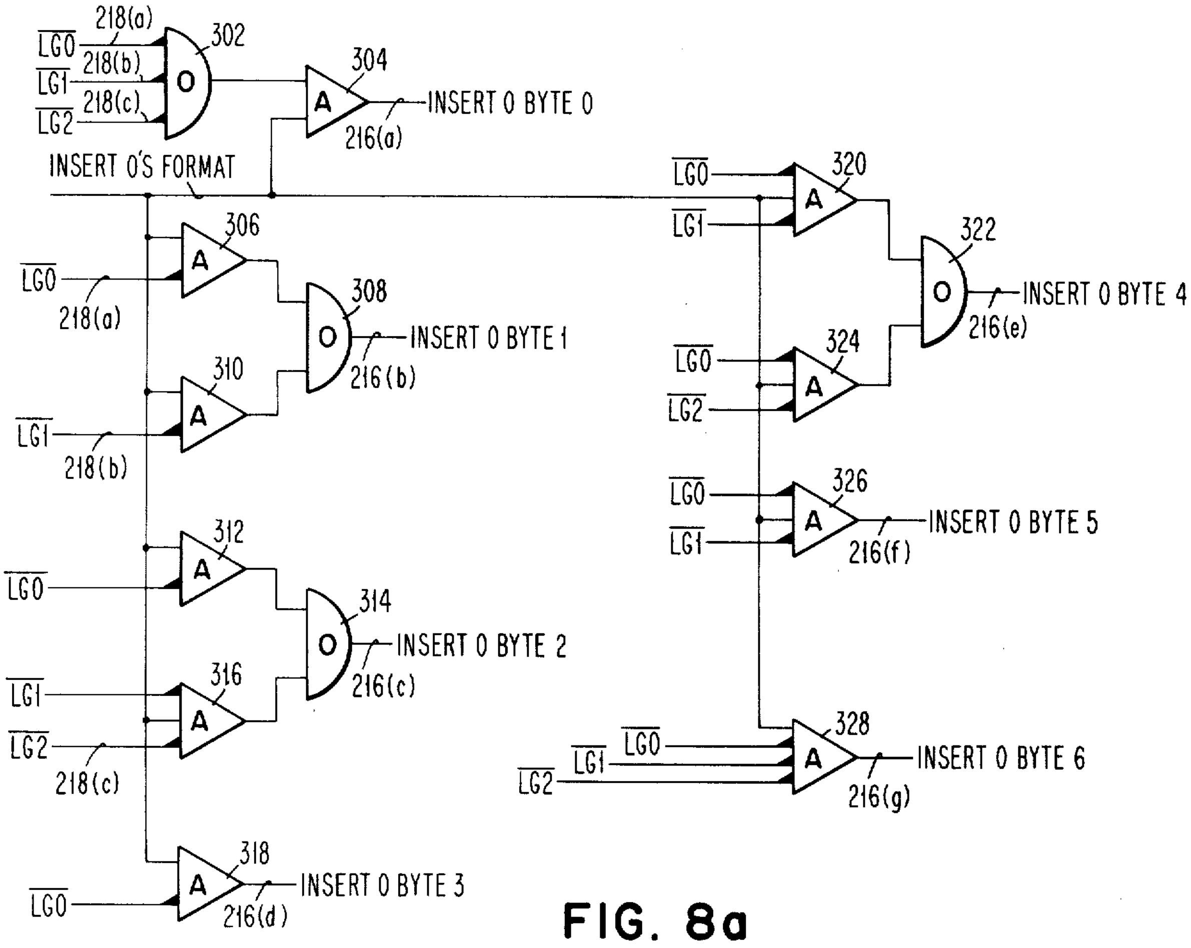
FIG. 8*a* is a detailed logic diagram for the insert zero byte flag decoder 214.
FIG. 8*b* is the truth table for the insert zero byte flag decoder.

Field 20 of the A-read microprogram control word of FIG. 15*b* contains a zero which instructs the formatting operation of insert zeros. The insert zero format signals input over line 126(20) to the AND gate 260 thereby connecting the output of the insert zero decoder 214 to the output line 216 connected to the shifter 108. The insert zero decoder is shown in detail in FIG. 8*a*. The length bits LG0 = 0, LG1 = 1, and LG2 = 1. Thus the input line 218(*a*) is gated by the OR 302 and the AND 304 to yield a one bit signal on output line 216(*a*). Line 216(*a*) is connected to the latch gate of the latch 109(*a*) shown in FIG. 7. A one bit signal on line 216(*a*) disables latch 109(*a*) and thus in spite of the wrap of data accomplished by the shifter 108, the latch for the zero byte position is not loaded and remains in the zero state. Similarly, line 218(*a*) is gated by AND 306, and OR 308 thereby yielding a one bit output on line 216(*b*) thereby turning byte one off. Line 218(*a*) is gated by means of AND 312 and OR 314 yielding a one bit signal on line 216(*c*) thereby turning byte 2 off. And finally, line 218(*a*) is gated by means of AND 318 thereby outputting a one bit signal on line 216($d$) thereby turning byte 3 off. Thus, is accomplished the insert zero formatting necessary to access the four byte information unit W, X, Y and Z and to right justify that information unit in byte locations 4, 5, 6 and 7 of the output data bus 138. The read gate map of FIG. 14$a$ shows the locations of the active gates for decoder 214.

Thus the bytes of interest have been automatically aligned through the shifter 108 through proper control line generation by the shifter hardware controls. The resulting four byte information unit loaded into the destination register is shown in Table IV.

TABLE IV

| | | | | | | | | |
|---|---|---|---|---|---|---|---|---|
| Byte Positions | φ | 1 | 2 | 3 | 4 | 5 | 6 | 7 |
| Byte Position Values | φ | φ | φ | φ | W | X | Y | Z |

Write Access With Storage in a Single Memory Word

In this example, the machine instruction decoder 121 requires that a three byte data unit be stored beginning at the storage address 18. The branch unit and CSAR update 120 caused the control storage address register 122 to access from the control store 116 the A-store microprogram control word shown in FIG. 15$c$. A one bit in the 3 field indicates a storage operation is to be performed. The zero bit in the 4 field indicates that the number of bytes to be stored is indicated by the length field 5-7, and causes the length field 010 to be loaded into the length register 202. Field 8–9 containing 0, 0 indicates that the SAR 112 is to be updated by the length field. Field 10-11 indicates which source register 162 contains the storage address to be loaded into the storage address register 112. Field 12-15 indicates which source register 158 contains the multibyte data field to be written into the desired memory word. The field 23-24 containing 1, 0 indicates that a branch to the B-store microprogram control word is to be executed if three bit adder 200 generates a carry bit CO on line 124. The storage address register 112 is loaded from the source register 162 and the three byte data field shown in Table V, which is stored right justified in the source register 158, is transferred to the input data bus 136 of the shifter 108.

The length field 5-7 is loaded into the length register 202 as LG0 = 0, LG1 = 1, LG2 = 0. The binary value of the length field is always one less than the actual length of the byte field to be accessed. The low order three bits in the storage address register 112 are loaded into the pointer register 206 as P0 = 0, P1 = 1, P2 = 0. The three bit binary added 200 executes a binary addition of the contents of the length register 202 and the contents of the pointer register 206, thereby yielding the sum bits S0 = 1, S1 = 0, S2 = 0. No carry bit C0 is generated. The shift gate decoder 212 receives the sum bits over line 208 as is shown in FIG. 12$a$. Input lines 208($a$), 208($b$) and 208($c$) are directed through the AND gate 812 and the OR gate 814 yielding a one bit signal on the R1 output line 132($b$). Input lines 208($a$), 208($b$) and 126(3)' are directed through AND gate 838 and OR gate 844 thereby yielding a one bit signal on the R4 output line 132($f$). Signals on line 132 are directed to the shifter 108 as is shown in FIG. 7.

The shifter 108 shifts the Xth bit of byte 5 by means of input bus 136($x$), and gate 752, line L16, bus 703, AND gate 776 and OR 725 is to the latch 109($c$)

thereby loading the bit into the number 2 byte position.

The Xth bit in byte 6 is directed from input bus 136($x$) through AND gate 760, line L17, bus 703, AND gate 780 and OR 735 to the latch 109($d$) for the byte position 3.

The Xth bit in byte 7 is directed by means of input bus 136($x$) through AND gate 704, line L10, bus 703, AND gate 784, and OR 745 to latch 109($e$) corresponding to byte number 4. The bytes X, Y and Z have effectively been shifted left three positions as is shown in Table VI.

TABLE V

| | | | | | | | | |
|---|---|---|---|---|---|---|---|---|
| Source Reg. Byte Positions | φ | 1 | 2 | 3 | 4 | 5 | 6 | 7 |
| Values of Bytes | a | b | c | d | e | X | Y | Z |

TABLE VI

| | | | | | | | | |
|---|---|---|---|---|---|---|---|---|
| Reg. Byte Positions | φ | 1 | 2 | 3 | 4 | 5 | 6 | 7 |
| Byte Values | d | e | X | Y | Z | a | b | c |

It is seen that the bytes of data to be written are automatically placed in the proper byte slot positions with respect to the given storage byte address 18. However, the content of the shifter output registers 109 cannot be used in their entirety to replace the contents of the memory word containing the source address 18. Only the byte values X, Y and Z are to be written into the memory word at the byte positions 2, 3 and 4 respectively. Other information must therefore be sent to the storage 106 in addition to the contents of the shifter output register 109, so that the proper bytes of the memory word are written during the store operation. This additional information is in the form of eight byte flags, each flag corresponding to a byte position to be written into the memory. The alignment hardware automatically turns on proper byte flags during the store operation based on a decode of the pointer 206 and the length 202 fields. The store then interrogates the eight byte flags to see which ones are on. Those that are on indicate the byte positions of a memory word which are to be written into and the other positions in the memory word are to be left undisturbed. The apparatus for accomplishing the byte flag function is the L-flag decoder 236 shown in detail in FIG. 10$a$ and the A-flag decoder 248, shown in detail in FIG. 11$a$.

The L-flag decoder 236 has as input the sum bits SO =to 1, S1 =0 and S2 = 0. The AND gate 522 is a zero bit output on line 234($b$). The AND gate 516 yields a zero output on the line 234($c$). The AND gate 516, the AND gate 518 and the OR gate 520 yield a zero bit on the output line 234($d$). The AND gate 510 yields a zero bit output on the line 234($e$). The AND gate 510, AND gate 512 and OR gate 514 yield a one bit output on line 234($f$). The AND gate 504, the AND gate 506 and the OR gate 508 yield a one bit on the output line 234($g$). And the OR gate 502 yields a one bit on the output line 234($h$).

The A-flag decoder 248 has as input the pointer bits PO = 0, P1 = 1, P2 = 0. FIG. 11 a shows the OR gate 602 yields a one bit on output line 240($a$). The AND 604, the AND gate 606 and the OR gate 608 yield a one bit output on line 240($b$). The AND gate 610, the AND gate 612, and the OR gate 614 yield a zero output on line 240($c$). The AND gate 610 yields a zero bit output on line 240(*d*). The AND gate 618, the AND gate 620, and the OR gate 622 yield a zero output on the line 240(*e*). The AND gate 618 yields a zero output bit on line 240(*f*). The AND gate 624 yields a zero bit output on line 240(*g*).

The output lines 234 from the L-flag decoder 236 and the output lines 240 from the A-flag decoder 248 are combined in the OR 238 and inverted in the inverter 268 to yield the byte flag pattern on line 241. The lack of a carry bit CO on line 124 causes the inverter 270 to activate the AND gate 242 on this store microword command. The byte flag pattern is thus gated onto line 136 to the storage 106. The resulting position of the byte flags and of the initial and final contents of the memory word are shown in Table VII.

TABLE VII

| | | | | | | | | |
|---|---|---|---|---|---|---|---|---|
| Byte Positions | φ | 1 | 2 | 3 | 4 | 5 | 6 | 7 |
| Shifter Output Reg. Byte Values | d | e | X | Y | Z | a | b | c |
| Byte Flags set on | | | * | * | * | | | |
| Storage Wd. 2 Byte Values Before | p | q | r | s | t | u | v | w |
| Storage Wd. 2 Byte Values After | p | q | X | Y | Z | u | v | w |

Table VIII shows the decoding table for turning on respective byte flags during a store operation based upon the value in the pointer register 206 and the value in the length register 202.

TABLE VIII

| Turn On Byte x Flag when: | Decimal Value of Pointer is | and | Decimal Value of LG Field is |
|---|---|---|---|
| Byte φ Flag | φ | | any value |
| Byte 1 Flag | φ | | ≥ 1 |
| | 1 | | any value |
| Byte 2 Flag | φ | | ≥ 2 |
| | 1 | | ≥ 1 |
| | 2 | | any value |
| Byte 3 Flag | φ | | ≥ 3 |
| | 1 | | ≥ 2 |
| | 2 | | ≥ 1 |
| | 3 | | any value |
| Byte 4 Flag | φ | | ≥ 4 |
| | 1 | | ≥ 3 |
| | 2 | | ≥ 2 |
| | 3 | | ≥ 1 |
| | 4 | | any value |
| Byte 5 Flag | φ | | ≥ 5 |
| | 1 | | ≥ 4 |
| | 2 | | ≥ 3 |
| | 3 | | ≥ 2 |
| | 4 | | ≥ 1 |
| | 5 | | any value |
| Byte 6 Flag | φ | | ≥ 6 |
| | 1 | | ≥ 5 |
| | 2 | | ≥ 4 |
| | 3 | | ≥ 3 |
| | 4 | | ≥ 2 |
| | 5 | | ≥ 1 |
| | 6 | | any value |
| Byte 7 Flag | φ | | = 7 |
| | 1 | | ≥ 6 |
| | 2 | | ≥ 5 |
| | 3 | | ≥ 4 |
| | 4 | | ≥ 3 |
| | 5 | | ≥ 2 |
| | 6 | | ≥ 1 |
| | 7 | | any value |

Read Access Where Data Lies Across Memory Word Boundary

The discussion in the examples so far has related to the case where only one memory access is required to complete the read or store operation. It is seen however, that two memory accesses will be required when the pointer 206 associated with the starting address and the number of bytes specified in fields 5–7 of the microprogram control words specify an access of a multibyte data unit which lies across a memory word boundary in two adjacent memory words. See for example the illustration in Table IX.

In this example the machine instruction decoder 121 requires that a read access of the main memory be executed for a six byte information unit starting at the storage byte address 19. The branch unit and CSAR update 120, in response to the machine instruction decoder request, causes the control storage address register 122 to access from the control store 116 the A-read microprogram control word shown in FIG. 15d. Field 3 of the microprogram control word contains a zero indicating that a read access is to be performed. Field 4 of the microprogram control word contains a zero indicating that the length of the field to be accessed will be found

TABLE IX

| | | | | | | | | | | | | | | | | |
|---|---|---|---|---|---|---|---|---|---|---|---|---|---|---|---|---|
| Byte Positions | φ | 1 | 2 | 3 | 4 | 5 | 6 | 7 | φ | 1 | 2 | 3 | 4 | 5 | 6 | 7 |
| Storage Word Address | | | | 2 | | | | | | | | 3 | | | | |
| Storage Byte Address | 16 | | | 19 | | | | | 24 | | | | | | | 31 |
| Values of Bytes of Interest | — | — | — | A | B | C | D | E | F | — | — | — | — | — | — | — |
| Pointer = 3 | | | | | | | | | | | | | | | | |
| LG Field = 5 | | | | | | | | | | | | | | | | |

in fields 5-7. Fields 5-7 contains the length field whose binary value is one less than the magnitude of the number of bytes to be accessed, that is six bytes are to be accessed and the binary number 101 which equals five is stored in the length field 5-7. Field 8-9 contains 0, 0 indicating that the SAR 112 is to be updated by the length of the field to be accessed. Field 10-11 identifies the source register 162 in the processor which contains the storage address to be loaded in the SAR 112. Field 16-19 identifies the destination register 160 which is to be loaded right justified with the multibyte data field accessed from the main memory. Field 20 contains the zero indicating the insert zero format is to be executed. Field 23-24 contains a 1, 0 indicating that if the branch unit and CSAR update 120 detects on line 124 a carry bit CO from the three bit binary adder 200, that the branch unit 120 is to branch to the B read microprogram control word shown in FIG. 15(*e*), which will contain a one bit in field 20 signalling the execution of the right of boundary format for the second access.

The A-read microprogram control word is loaded in the control register 118. Field 4 causes the contents of Field 5-7 to be loaded into the length register so that bits to be LGO = 1, LG1 = 0, LG2 = 1. The storage address is transferred from the source register 162 to the storage address register 112 and is the binary value 10011. The low order three bits 011 are loaded into the pointer register 206 so that PO = 0, P1 = 1 and P2 = 1.

The three bit binary adder 200 executes the addition of the contents of the length register 202 and the contents of the pointer register 206 which yields the sum bits SO = 0, S1 = 0 and S2 = 0. The carry bit CO = 1 and a one bit is output on line 124.

The storage address register 112 transfers the high order bits 10 over the address line 131 to the storage 106 to access memory word number 2 containing bytes numbered 16 through 23, see Table IX. Memory word 2 is transferred over the memory out bus 142 to the input shifter bus 136 of the shifter 108.

The shift decoder 212 of FIG. 12(*a*) has as its inputs the SO bit = 0, the SI bit = 0 and the S2 bit = 0 over lines 208(*a*), 208(*b*) and 208(*c*) respectively. These input bit signals are processed by AND gate 820 and OR gate 824 to yield a one bit output signal on the R3 signal line 132(*d*). The input bits are directed through AND gate 836 and OR gate 844 to yield a one bit signal on the R4 output line 132(*f*). The R3 and R4 signals are transferred from the shift gate decoder 212 over line 132 to the shifter 108.

The shifter 108 in FIG. 7 directs the Xth bit of byte 3 from shifter input bus 136(X) through the AND gate 756, the line L16, the level 1 out bus 703, and AND gate 776, and the OR gate 725 to the latch 109(*c*) which corresponds to byte 2.

Similarly with bytes 4, 5, and 6. The shifter directs the Xth bits of byte 7 from the input shifter bus 136(X) through AND gate 724, line L12, bus 703, AND gate 792, and OR gate 765 to latch 109(*g*), corresponding to the byte 6 postion. It is seen in Table X that the shifting operation has resulted in a left shift of the five significant bytes A, B, C, D and E by one byte unit.

The insert zero decoder 214 operates on the length register bits LGO = 1, LG1 = 0, LG2 = 1 input on lines 218(*a*), 218(*b*) and 218(*c*), respectively. Information input on line 218(*b*) is directed through OR gate 302 and AND gate 304 yielding a one bit output on line 216(*a*). The one bit on line 216(*a*) is directed to the invert AND gate 850 to the latch 109(*a*) to prevent signal output from the OR 705 to be loaded into the latch 109(*a*) thereby inserting the value of zero in the output latch for the byte position zero. Similarly, input line 218(*b*) is directed through AND gate 310 and OR gate 308 to yield a one bit output on line 216(*b*) thereby inserting a zero in byte position one in the latch 109(*b*) of the shifter 108. The contents of the output latches 109(*a*)-109(*h*) now appears as is shown in Table X.

TABLE X

| | | | | | | | | |
|---|---|---|---|---|---|---|---|---|
| Byte positions | φ | 1 | 2 | 3 | 4 | 5 | 6 | 7 |
| Values of contents | φ | φ | A | B | C | D | E | — |

The SAR 112 is now updated. The value of the contents in the length register 202 is transferred by means of line 218 to the ALU 114 and added to the initial contents of SAR 112. The value of one is added to this sum yielding the updated storage address of 25 or 11001. The carry bit CO = 1 on line 124 and the late time signal on line 203 cause the AND gate 224 to load sum bits S0, S1 and S2 into length register 202 locations LG0, LG1 and LG2, respectively, and causes AND gate 222 to force pointer register locations P0, P1 and P2 all to zero.

Figure 15:
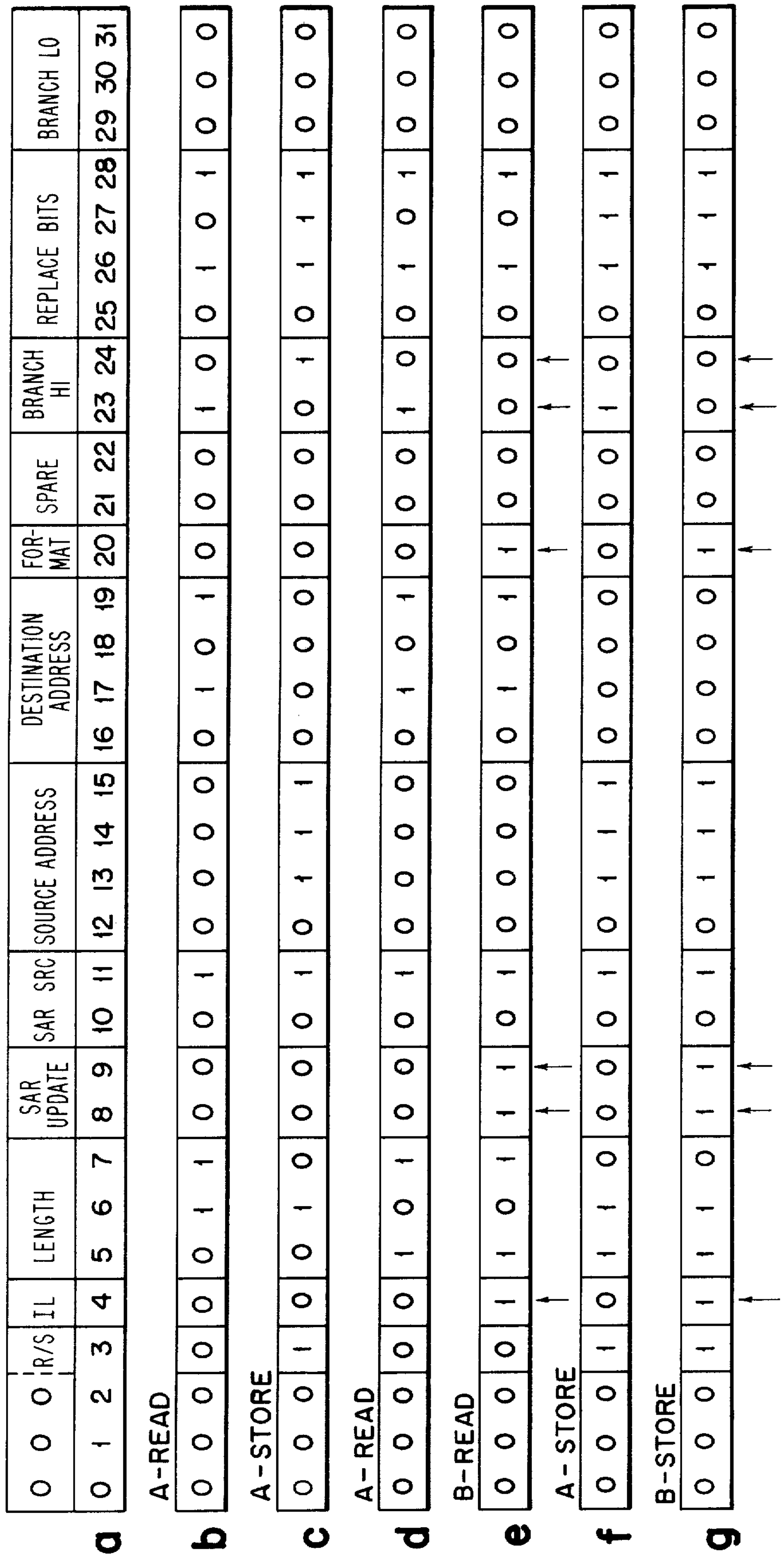
FIG. 15 shows examples of microprogram control words for executing the accessing functions described in the discussion of the operation of the invention.

Since the carry bit CO = 1 and a one bit signal is on line 124, the branch unit 120 causes the control storage address register 122 to access from the control store 116 the B-read microprogram control word shown in FIG. 15(*e*). The operation of the branch unit 120 is similar to the branch on condition operation described in U.S. Pat. No. 3,400,371 issued Sept. 3, 1968, to G. M. Amdahl, et al., at column 239. The W register in the Amdahl FIG. 4I is equivalent to the CSAR 122, the control memory AI in the Amdahl FIG. 4 AM is equivalent to the control store 116, and the shaping amp latches in the Amdahl FIG. 4 AM is equivalent to the control register 118. The branch units 120 upon detecting that the $C_o$ carry bit equals 1, causes a branch to the B-read microprogram control word illustrated in FIG. 2(*a*) and FIG. 15(*e*). The branch unit 120 causes the CSAR 122 to access from the control store 116 the B-read microprogram control word whose data fields are modified with respect to the fields in the A-read microprogram control word at fields 4, 8, 9, 20, 23 and 24. The B-read microprogram word is loaded into the control register 118.

The B-read microprogram control word of FIG. 15(*e*) contains a one bit in field 4 which signifies that the sum bits S0, S1 and S2 have been loaded into the length register replacing bits LG0, LG1 and LG2, respectively, as the length to be accessed. Field 8, 9 contains bits 1, 1 which indicates that the storage address register is not to be updated after the second access. Field 20 contains a one bit which indicates that the set to the right of boundary formatting operation is to be performed on the information accessed from the second memory word. Fields 23, 24 contain 0, 0 which indicates that the contents of field 20 is to be replaced with a zero (no logical branch).

The B-read microprogram control word stored in control register 118 causes the following functions to be performed via the line 126. The contents of the storage address register 112 having been updated by the previous A-read microprogram control word, contains the value 11001. The high order bits 11 corresponding to the memory word 3, are transferred by means of the address line 131 to the storage 106 thereby accessing the contents of memory word 3 shown in Table XI.

TABLE XI

| | | | | | | | | |
|---|---|---|---|---|---|---|---|---|
| Byte Positions | 0 | 1 | 2 | 3 | 4 | 5 | 6 | 7 |
| Shifter Input Bus-Word 3 | F | — | — | — | — | — | — | — |
| After Shift-Shifter Output | — | — | — | — | — | — | — | F |
| Initial Contents-Shifter Output Reg | φ | φ | A | B | C | D | E | — |
| Final Contents-Shifter Output Reg | φ | φ | A | B | C | D | E | F |

The eight bytes of memory words 3 are transferred over the input data bus 142 to the input shifter bus 136.

The carry bit CO = 1 signal on line 124 has caused the AND gate 222 to force the pointer register 206 to contain all zeros so that PO =0, P1 = 0 P2 = 0, as previously discussed. The length register bits LGO = 0, LG1 = 0 and LG2 = 0, as was previously discussed. The three bit binary adder 200 adds the contents of the length register 202 and the contents of the pointer register 206 and yields the sum bits S0 = 0, S1 = 0, and S2 = 0 which are output on line 208. The carry bit CO now equals zero and is output on line 124.

Field 20 of the B-read microprogram control word of FIG. 15e contains a one bit which indicates that the right of boundary formatting operation is to be executed. The right of boundary decoder 226 shown in FIG. 9A operates on the length register bits LG0, LG1 and LG2 from the input lines 218(*a*), 218(*b*) and 218(*c*) respectively. The right of boundary decoder maintains the byte 7 flag always in the on or one bit state. Thus, the byte 7 right of boundary flag is on and is conducted through AND gate 230 and OR gate 262 over line 134 to the shifter 108. FIG. 7 shows that the latch 109*h* of the shifter 108 has a set signal on line 134(*h*) permitting information transmitted through the OR gate 775 to be loaded into the latch corresponding to byte location 7. Latches 109(*a*) through 109(*g*) corresponding to byte positions 0 through 6 do not have a signal on their corresponding set line 134*a* through 134*g*. Thus, whatever shifting function is performed by the shifter during the second access under the control of the B-read microprogram control word, the result will only be stored for the byte location 7.

The shift decoder 112 shown in FIG. 12*a* outputs on the sum bits S0 = 0, S1 = 0 and S2 = 0. The bits are directed through the AND gate 820 and the OR gate 824 to yield a one bit on the R3 output line 132(*d*). Sum bits are operated upon by the AND gate 836 and the OR gate 844 to yield a one bit signal on the R4 output line 132(*f*). Line 132 is directed to the shifter 108.

The shifter 108 receives on the input shifter bus the eight bytes of data accessed from memory word 3 in the storage 106. The Xth bit of byte zero is conducted from input shifter bus 136(*x*) through the AND gate 732 to the line L13, the bus 703, the AND gate 796, the OR gate 775 to the latch 109(*h*) corresponding to the byte position 7. Since field 20 of the B-read microprogram control word contains the one, no insert zero formatting is executing. The right of boundary decoder set only line 134(*h*) for latch 109(*h*), the data from byte zero in the accessed memory word three is loaded into the latch 109(*h*) corresponding to byte number 7.

The contents of the shifter output latches 109 is shown in Table XI as 00ABCDEF. THis right justified six byte information unit which was accessed from across memory word boundaries in the storage 106, is loaded right justified into the destination register 160 of the processor.

Write Access Where the Multibyte Data Unit is to be Stored Across Memory Word Boundaries In this example, machine instruction decoder 121 requires that a 7 byte information unit contained right justified in the source register 158 to be written into the memory 106 starting at the source address 28, the value of which is contained in the source register 162. The proposed relative position of the 7 bytes A, B, C, D, E, F and G in memory words 3 and 4 is shown in Table XII and the existing position for the bytes A, B, C, D, E, F and G in the source register 158 is shown in Table XIII.

TABLE XII

| | | | | | | | | | | | | | | | | |
|---|---|---|---|---|---|---|---|---|---|---|---|---|---|---|---|---|
| Byte Positions | ϕ | 1 | 2 | 3 | 4 | 5 | 6 | 7 | ϕ | 1 | 2 | 3 | 4 | 5 | 6 | 7 |
| Storage Word Address | | | | 3 | | | | | | | | 4 | | | | |
| Storage Byte Address | 24 | | | | 28 | | | 31 | 32 | | | 35 | | | | 39 |
| Value of Byte Contents Before | — | — | — | — | — | — | — | — | — | — | — | — | — | — | — | — |
| Value After 1st Store | — | — | — | — | A | B | C | D | — | — | — | — | — | — | — | — |
| Value After 2nd Store | — | — | — | — | A | B | C | D | E | F | G | — | — | — | — | — |

TABLE XIII

| | | | | | | | | |
|---|---|---|---|---|---|---|---|---|
| Source Reg. Byte Positions | ϕ | 1 | 2 | 3 | 4 | 5 | 6 | 7 |
| Value of Contents | X | A | B | C | D | E | F | G |

The machine instruction decoder 121 causes the branch unit and CSAR update 120 to make the CSAR 122 access the A store microprogram control word from control store 116 and load it into the control register 118. The A-store microprogram control word is shown in FIG. 15*f*. The A-store microprogram control word of FIG. 15*f* contains a one bit in field 3 indicating that a storage operation is to be performed. Field 4 contains a zero bit indicating that the contents of the length field 5-7 is to be loaded into the length register 202. The length field 5-7 contains the binary value 110 which is one less than the 7 bytes to be stored. Field 8,9 contains 0,0 indicating that the SAR 118 is to be updated by the length of the field accessed. Field 10, 11 indicates the identity of the source register 162 containing the storage address to be accessed. Field 12-15 contains the identity of the source register 158 containing the right justified data field to be stored in the storage 106. Field 23, 24 contains 1, 0 indicating that in the event the three bit adder 200 generates a carry CO = 1, that the branch unit 120 is to branch to the B-store microprogram control word of FIG. 15g which is to contain a one bit in field 20.

The A store microprogram control word in control register 118 commands the following functions to be performed over line 126. The contents of the length field 5-7 is loaded into the length register 202 as LG0 = 1, LG0 = 1, LG2 = 0. The storage address of 28 which in binary is 11100 is transferred from the source register 162 in the processor to the storage address register 112. The low order three bits of the storage address of 100 are transferred from the storage address register 112 over line 130 to the pointer register 206 so that PO equals 1, P1 equals 0, and P2 equals 0. The high order bits of the storage address 11 in the storage address register 112 are transferred over address line 131 to the storage 106 thereby accessing memory word 3 and making it available for the storage of the data fields to be outputted by the processor over the processor data bus 154. The right justified 7 byte information unit A, B, C, D, E, F and G is transferred from the source register 158 over line 140 to the input shifter bus 136 of the shifter 108. The three bit binary adder 200 adds the contents of the length register 202 to the contents of the pointer register 206 and yeilds the sum bits S0 = 0, S1 = 1 and S2 = 0. The carry output CO = 1 and a carry signal is output on line 124.

The shift decoder 212 of FIG. 12a operates on the sum bits S0 = 0, S1 = 1 and S2 = 0 input on lines 208(*a*), 208(*b*) and 208(*c*) respectively. Information on line 208(*b*) and 208(*c*) is processed by the AND gate 822 and the OR gate 824 to yield a one bit output on the R3 line 132(*d*). The information on the lines 208(*a*), 208(*b*) and 208(*c*) is operated on by the AND gate 830 and the OR gate 834 to yield a one bit output on line R02 line 132(*e*). Line 132 is directed to the shifter 108.

The shifter 108 of FIG. 7 operates on the Xth bit of byte 1 on input shifter bus 136X by directing it through the AND gate 740, the line L14, the bus 703, the AND gate 782, and the OR gate 745 to the latch 109(*e*) corresponding to byte number 4. The Xth bit of byte 2 is directed from the output shifter bus 136(X) by the AND gate 748, the line L15, the bus 703, the AND gate 786, and the OR gate 755 to the latch 109(*f*) corresponding to the byte number 5. The Xth bit of byte number 3 is directed from the input shifter bus 136(*x*) by the AND gate 756, the line L16, the bus 703, the AND gate 790, and the OR gate 765 to the latch 109(*g*) corresponding to byte number 6. The Xth bit of byte number 4 is directed from the input shifter bus 136(*x*) by the AND gate 764, the line L17, the bus 703, the AND gate 794, and the OR gate 775 to the latch 109(*h*) corresponding to the byte position 7.

The A flag decoder 248 shown in FIG. 11*a* operates on the pointer 206 bit P0 = 1, P1 = 0 and P2 = 0 on the input lines 250(*a*), 250(*b*) and 250(*c*), respectively. The OR gate 602 yields a one bit on output line 240(*a*) which is inverted by inverter 266 to yield a zero bit on output line 136(*a*). The AND gate 604 and the OR gate 608 yield a one bit on output line 240(*b*) which is inverted by the inverter 266 to yield a zero bit output on line 136(*b*). The AND gate 610 and the OR gate 614 yields a one bit on output line 240(*c*) which is inverted by inverter 266 to yield a zero bit on output line 136(*c*). The AND gate 610 yields a one bit on output line 240(*d*) which is inverted by inverter 266 to yield a zero output on line 136(*d*). The AND gate 618 and the AND gate 620 and the OR gate 622 yield a zero bit on output line 240(*e*) which is inverted by the inverter 266 to yield a one bit on output line 136(*e*). The AND gate 618 yields a zero bit on output line 240(*f*) which is inverted by the inverter 266 to yield a one bit on output line 136(*f*). The AND gate 624 yields a zero bit on output line 240(*g*) which is inverted by inverter 266 to yield a one bit on output line 136(*g*). The A flag decoder yields a zero bit on output line 240(*h*) which is converted by inverter 266 to yield a one biton output line 136(*h*). The memory byte storage flags are outputted over line 136 to the memory 106 so that byte positions 4, 5, 6 and 7 in memory word 3 may be written into as is shown in Table XII. The contents of the output latches 109(*a*) through 109(*h*) corresponding to byte positions 0 through 7 is outputted over the shifter output bus 138(*x*) and is transmitted over the processor data bus 154 to the storage 106. Since byte flags are on only for byte positions 4, 5, 6 and 7, the bytes A, B, C and D are written at memory byte locations 28, 29, 30 and 31 and the balance of memory word 3 is left undisturbed.

After the bytes A, B, C and D have been stored im memory word 3, on cue from the late timing signal over line 203, the present value of the contents of the length register 202 which is 6, is added to the numerical value of the storage address in the storage address register 112 to which is added the value 1 thereby yielding the updated storage address 35 which is loaded into SAR 112 as the binary number 100011. The contents of the length register is then replaced by the sum bits S0, S1 and S2 for LG0, LG1, and LG2, respectively. The AND gate 222 forces the contents of the pointer register to zero such that P0 = 0, P1 = 0 and P2 = 0.

The branch unit 120 detecting that the carry bit CO = 1 on line 124, commands a branch to the B store microprogram control word of FIG. 15G. The CSAR 122 is directed to access from the control store 116 the B store microprogram control word and to load it into the control register 118. The B store microprogram control of FIG. 15*g* is similar to the A store microprogram control word of FIG. 15*f* except for changes in fields 4, 8, 9, 23 and 24. A one bit in field 4 indicates that the length to be accessed is now found in the length register. The field 8, 9 containing 1, 1 indicates that the SAR 112 is not to be updated. The field 23, 24 containing 0, 0 indicated field 20 is to be replaced with a zero (no logical branching). The B store microprogram control word in control register 118 commands the following functions over line 126. The high order bits 100 in the storage address register 112 are directed over the address line 131 to the storage 106 thereby accessing memory word 4 and making it available for writing information to be input over the processor bus 154. The contents of source register 158 which has remained undisturbed in its right justified state as shown in Table XIII, is transferred over line 140 to the input shifter bus 136 of the shifter 108. The contents 000 of the pointer register 206 and the contents 010 of the length register 202 are added in the three bit binary adder 200 yielding sum bits S0 = 0, S1 = 1 and S2 = 0. The carry bit CO = 0.

The shift decoder 212, FIG. 12a operates on the sum bits S0 = 0, S1 = 1 and S2 = 0, on the input lines 208(*a*), 208(*b*) and 208(*c*), respectively. Line 208(*b*) and 208(*c*) are directed by AND gate 822 and OR gate 824 to yield a one bit output on the R3 line 132(*d*). Lines 208(*a*), 208(*b*) and 208(*c*) are operated upon by the AND gate 830 and the OR gate 834 to yield a one bit output on line R02, line 132(*e*). Line 132 is directed to the shifter 108.

Shifter 108 of FIG. 7 operates upon the Xth bit of byte 5 in the input shifter bus 136(*x*) directing it through AND gate 708, line L10, bus 703, AND gate 766, OR gate 705 to the latch 109(*a*) which corresponds to the byte position zero. The Xth bit of byte 6 is directed from the input shifter bus 136(*x*) to AND gate 716, line L11, bus 703, AND gate 770, and OR gate 715 to the latch 709(*b*) corresponding to the byte position one. The Xth bit of bytes 7 is directed from the input shifter bus 136(*x*) through the AND gate 724, the line L12, the bus 703, the AND gate 774, and the OR gate 725 to the latch 109(*c*) corresponding to byte position two. It is seen that the bytes E, F and G have been transferred and left shifted by five positions.

The L byte flag decoder 236 shown in FIG. 10*a* operates upon the S0 bit = 0, the S1 bit = 1, and the S2 bit = 0 input on lines 208(*a*), 208(*b*) and 208(*c*) respectively. The L flag decoder issues a zero bit on line 234(*a*). The AND gate 522 issues a zero bit on line 234(*b*). The AND gate 516 issues a zero bit on line 234(*c*). The AND gate 516, the AND gate 518, and the OR gate 520 issue a one bit on line 234(*d*). The AND gate 510 issues a one bit on line 234(*e*). The AND gate 510, the AND gate 512, and the OR gate 514 issue a one bit on line 234(*f*). The AND gate 504, the AND gate 506, and the OR gate 508 issues a one bit on line 234(*g*). The OR gate 502 issues a one bit on line 234(*h*).

The A flag decoder 248 shown in FIG. 11*a* operates upon the input bits P0 = 0, P1 = 0 and P2 = 0 on the input lines 250(*a*), 250(*b*) and 250(*c*) respectively. The A flag decoder issues a zero bit output on lines 240(*a*) through 240(*h*). The output on line 234 from the L flag decoder 236 and the output on line 240 from the A flag decoder 248 is combined in the OR 238 and is output on line 239 and inverted by the inverter 268 and output on line 241 and transferred through AND gate 242 and OR gate 246 to the output on line 136 as follows: 136($a$) = 1, 136($b$) = 1, 136($c$) = 1, 136($d$) = 0, 136($e$) = 0, 136($f$) = 0, 136($g$) = 0, 136($h$) = 0. These memory byte store flags are output on line 136 to the storage 106. This results in permitting byte positions 32, 33 and 34 in the memory word 4 to be available for writing. The contents of the output latches 109($a$) through 109($h$) corresponding to the bit positions 0 through 7 is output from the shifter 108 over shifter output bus 138($x$) shown in FIG. 7 and is directed over the processor data bus 154 to the storage 106. Memory word 4 being accessed and byte positions 0, 1 and 2 having byte flags on, the bytes E, F, and G are stored therein as is shown in Table XII. Thus is completed the operation of storing a multibyte data unit across memory word boundaries in the storage 106. The above discussion of the operation of the invention illustrates that multibyte data fields may be accessed and justified in no more than two control word cycles through the cooperation of the microcontrol word and the simplified hardware disclosed herein. The apparatus enhances the efficiency of multibyte data transfers between the processor and its main memory without unduly adding to the complexity of the hardware in the processor or memory unit.

It can be readily seen that although the processor registers were described as being loaded right justified, the system would work equally well if the processor registers were disclosed as requiring left justification. In such a case all right shifts described herein for the shifter 108 would be replaced by left shifts and correspondingly, all left shifts described herein for the shifter 108 would be replaced by right shifts. It can be further seen that although the preferred embodiment disclosed is for use with a memory organization having 8 bytes per memory word, the apparatus disclosed would work equally well for any memory organization wherein the memory word contained $2^N$ bytes, where N is an integer. In such case, the shifter 108 would remain a two stage shifter but would have $2^N$ level-one output lines instead of the 8 level-one output lines L10 through L17 shown in FIG. 7. And correspondingly, there would be $2^N$ latches 109 instead of the disclosed 8. Furthermore, the length register 202 would contain N bits instead of the disclosed 3, the pointer register 206 would contain N bit positions instead of the disclosed 3 and the adder 200 would process N bits and yield a sum field of N sum bits instead of the disclosed 3.

While the invention has been particularly shown and described with respect to the preferred embodiments thereof, it will be understood by those skilled in the art that the foregoing and other changes in form and details may be made therein without departing from the spirit and scope of the invention.

We claim:

1. An information processing system, comprising:

a random access structured memory unit addressable in words of $2^N$ bytes;

a storage address register connected to said random access memory unit for addressing words stored therein;

a processing unit having a processor register having $2^N$ byte fields numbered 0 to $2^N-1$ from the left for storing right aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N bit binary adder connected to said length register and said pointer register, and having an N-bit sum output and a carry output, for adding the contents of the length register to the contents of the pointer register;

said shifting means having an input connected to said sum output of said binary adder, for right shifting the type fields accessed from said memory unit in a read operation, by a number of bytes equal to $2^N-1$ minus the value of said sum, in accordance with said control word;

said shifting means left shifting the right justified byte field input from said processor register in a write operation by a number of bytes equal to $2^N-1$ minus the value of said sum, in accordance with said control word;

whereby multiple byte data fields can be transferred between the processor and memory unit under the control of a minimum number of control words.

2. The information processing system of claim 1, which further comprises:

a read formatting means having a data input connected to said length register and a control input connected to said control word register, for inserting zeros in the number of leftmost byte fields equal to $2^N-1$ minus the value of length register contents, for the byte fields read from said memory, in accordance with said control words;

whereby all necessary byte masking is accomplished for the leftmost bytes in the right justified byte fields read from said memory unit.

3. The information processing system of claim 1, which further comprises:

a write formatting means having a data input connected to said pointer register and a data input connected to said sum output of said binary adder, for identifying the group of contiguous byte lines on said memory bus between the byte field number equal to the value of said sum and the byte field number equal to the value of said pointer, over which bytes are to be written into said memory unit;

whereby less than $2^N$ contiguous bytes are selectively written into said memory.

4. The information processing system of claim 1 which further comprises:

a control word branch unit having a control input connected to said carry output of said binary adder and a data input connected to said control word register;

a control word storage having an input connected to said branch unit and an output connected to said control word register;

a first gate means for conditionally connecting the input of said length register to said sum output of said binary adder when a carry signal occurs indicating the accessing of a multibyte field which lies in two contiguous words of said memory;

a second gate means for conditionally setting the input of said pointer register to zero when said carry signal occurs;

said branch unit responsive to said carry signal from said binary adder to access from said control word storage a second control word which is loaded in said control word register to initiate the accessing of the second portion of said multibyte field in the rightmost of said two memory words;

said sum output loaded into said length register representing the length of said second portion of said multibyte field;

whereby a multibyte field can be written across a memory word boundary in said memory unit under the control of two control words.

5. The information processing system of claim 4, which further comprises:

a cross boundary formattng means having a control input connected to said control word register, a data input connected to said length register, and an output connected to said shifting means, to conditionally reset byte fields numbered $2^N$-1 minus the value of contents in the length register to $2^N$-1, in said shifting means in response to said second control word when a memory read is specified;

said second control word specifying that said read formatting means be inoperative during the accessing of said second memory word so that the byte fields accessed therefrom are loaded into said shifting means without disturbing the byte fields accessed from said first memory word;

whereby a multibyte field can be read from two contiguous memory words and be stored right justified in said processor register under the control of two control words.

6. An information processing system, comprising:

a random access structured memory unit addressable in words of $2^N$ bytes;

a storage address register connected to said random access structured memory unit for addressing words stored therein;

a processing unit having a processor register having $2^N$ byte fields numbered 0 to $2^N$-1 from the left for storing right aligned data and a control unit having a control word register for storing a control word specifying a read or write operation and the byte length of the field to be accessed in said memory unit;

a shifting means connected to said processor register by a $2^N$ byte processor bus and connected to said memory unit by a $2^N$ byte wide memory bus and having a read/write control input connected to said control word register;

a length register connected to said control was register for storing in binary the value of one less than the byte length of the field to be accessed in said memory unit;

a pointer register connected to said storage address register for storing the N low order binary bits of a storage address;

an N bit binary adder connected to said length register and said pointer register, and having an N-bit sum output and a carry output, for adding the contents of the length register to the contents of the pointer register;

said shifting means having an input connected to said sum output of said binary adder, for right shifting the byte fields accessed from said memory unit in a read operation, by a number of bytes equal to $2^N$-1 minus the value of said sum, in accordance with said control word;

said shifting means left shifting the right justified byte field input from said processor register in a write operation, by a number of bytes equal to $2^N$-1 minus the value of said sum, in accordance with said control word;

a read formatting means having a data input connected to said length register and a control input connected to said control word register, for inserting zeros in the number of leftmost byte fields equal to $2^N$-1 minus the value of length register contents, for the byte fields read from said memory, in accordance with said control words;

a write formatting means having a data input connected to said pointer register and a data input connected to said sum output of said binary adder, for identifying the group of contiguous byte lines on said memory bus between the byte field number equal to value of said sum and the byte field number equal to value of said pointer, over which bytes are to be written into said memory unit;

whereby less than $2^N$ contiguous bytes can be selectively written into said memory under the control of a single control word.

7. An information processing system, comprising:

a random access structured memory unit addressable in words of $2^N$ bytes;

a storage address register connected to said random access structured memory unit for addressing words stored therein;

a processing unit having a processor register having $2^N$ byte fields numbered 0 to $2^N$-1 from the left for storing right aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for right shifting the byte fields accessed from said memory unit in a read operation, by a number of bytes equal to $2^N$-1 minus the value of said sum, in accordance with said control word;

said shifting means left shifting the right justified byte field input from said processor register in a write operation, by a number of bytes equal to $2^N$-1 minus the value of said sum, in accordance with said control word;

a write formatting means having a data input connected to said pointer register and a data input connected to said sum output of said binary adder, for identifying the group of contiguous byte lines on said memory bus between the byte field number equal to value of said sum and the byte field number equal to value of said pointer, over which bytes are to be written into said memory unit;

a control word branch unit having a control input connected to said carry output of said binary adder and a data input connected to said control word register;

a control word storage having an input connected to said branch unit and an output connected to said control word register;

a first gate means for conditionally connecting the input of said length register to said sum output of said binary adder when a carry signal occurs indicating the accessing of a multibyte field which lies in two continguous words of said memory;

a second gate means for conditionally setting the input of said pointer register to zero when said carry signal occurs;

said branch unit responsive to said carry signal from said binary adder to access from said control word storage a second control word which is loaded in said control word register to initiate the accessing of the second portion of said multibyte field in the rightmost of said two memory words;

said sum output loaded into said length register representing the length of said second portion of said multibyte field;

whereby a multibyte field can be written across a memory word boundary in said memory unit under the control of two control words.

8. An information processing system, comprising:

a random access structured memory unit addressable in words of $2^N$ bytes;

a storage address register connected to said random access memory unit for addressing words stored therein;

a processing unit having a processor register having $2^N$ byte fields numbered 0 to $2^N$-1 from the left for storing right aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for right shifting the byte fields accessed from said memory unit in a read operation, by a number of bytes equal to $2^N$-1 minus the value of said sum, in accordance with said control word;

said shifting means left shifting the right justified byte field input from said processor register in a write operation, by a number of bytes equal to $2^N$-1 minus the value of said sum, in accordance with said control word;

a read formatting means having a data input connected to said length register and a control input connected to said control word register, for inserting zeros in the number of leftmost byte fields equal to $2^N$-1 minus the value of length register contents, for the byte fields read from said memory, in accordance with said control words;

a control word branch unit having a control input connected to said carry output of said binary adder and a data input connected to said control word register;

a control word storage having an input connected to said branch unit and an output connected to said control word register;

a first gate means for conditionally connecting the input of said length register to said sum output of said binary adder when a carry signal occurs indicating the accessing of a multibyte field which lies in two contiguous words of said memory;

a second gate means for conditionally setting the input of said pointer register to zero when said carry signal occurs;

said branch unit responsive to said carry signal from said binary adder to access from said control word storage a second control word which is loaded in said control word register to initiate the accessing of the second portion of said multibyte field in the rightmost of said two memory words;

said sum output loaded into said length register representing the length of said second portion of said multibyte field;

a cross boundary formatting means having a control input connected to said control word register, a data input connected to said length register, and an output connected to said shifting means, to conditionally reset byte fields numbered $2^N$-1 minus the value of contents in length register to $2^N$-1, in said shifting means in response to said second control word when a memory read is specified;

said second control word specifying that said read formatting means be inoperative during the accessing of said second memory word so that the byte fields accessed therefrom are loaded into said shifting means without disturbing the byte fields accessed from said first memory word;

whereby a multibyte field can be read from two contiguous memory words and be stored right justified in said processor register under the control of two control words.

9. An information processing system, comprising:

a random access structured memory unit addressable in words of $2^N$ bytes;

a storage address register connected to said random access memory unit for addressing words stored therein;

a processor unit having a processor register having $2^N$ byte fields numbered 0 to $2^N$-1 from the right for storing left aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for left shifting the byte fields accessed from said memory unit in a read operation, by a number of bytes equal to $2^N$-1 minus the value of said sum, in accordance with said control word;

said shifting means right shifting the left justified byte field input from said processor register in a write operation, by a number of bytes equal to $2^N$-1 minus the value of said sum, in accordance with said control word.

whereby multiple byte data fields can be transferred between the processor and memory unit under the control of a minimum number of control words.

10. The information processing system of claim 9, which further comprises:

a read formatting means having a data input connected to said length register and a control input connected to said control word register, for inserting zeros in the number of rightmost byte fields equal to $2^N$-1 minus the value of length register contents, for the byte fields read from said memory, in accordance with said control words;

whereby all necessary byte masking is accomplished for the righmost bytes in the left justified byte fields read from said memory unit.

11. The information processing system of claim 9, which further comprises:

a write formatting means having a data input connected to said pointer register and a data input connected to said sum output of said binary adder, for identifying the group of contiguous byte lines on said memory bus between the byte field number equal to value of said sum and the byte field number equal to value of said pointer, over which bytes are to be written into said memory unit;

whereby less than $2^N$ contiguous bytes are selectively written into said memory.

12. The information processing system of claim 9 which further comprises:

a control word branch unit having a control input connected to said carry output of said binary adder and a data input connected to said control word register;

a control word storage having an input connected to said branch unit and an output connected to said control word register;

a first gate means for conditionally connecting the input of said length register to said sum output of said binary adder when a carry signal occurs indicating the accessing of a multibyte field which lies in two contiguous words of said memory;

a second gate means for conditionally setting the input of said pointer register to zero when said carry signal occurs;

said branch unit responsive to said carry signal from said binary adder to access from said control word storage a second control word which is loaded in said control word register to initiate the accessing of the second portion of said multibyte field in the leftmost of said two memory words;

said sum output loaded into said length register representing the length of said second portion of said multibyte field;

whereby a multibyte field can be written across a memory word boundary in said memory unit under the control of two control words.

13. The information processing system of claim 12, which further comprises:

a cross boundary formatting means having a control input connected to said control word register, a data input connected to said length register, and an output connected to said shifting means, to conditionally reset byte fields numbered $2^N$-1 minus the value of contents in length register to $2^N$-1, in said shifting means in response to said second control word when a memory read is specified;

said second control word specifying that said read formatting means be inoperative during the accessing of said second memory word so that the byte fields accessed therefrom are loaded into said shifting means without disturbing the byte fields accessed from said first memory word;

whereby a multibyte field can be read from two contiguous memory words and be stored left justified in said processor register under the control of two control words.

14. An information processing system, comprising:

a random access structured memory unit addressable in words of $2^N$ bytes;

a storage address register connected to said random access memory unit for addressing words stored therein;

a processing unit having a processor register having $2^N$ byte fields numbered 0 to $2^N$-1 from the right for storing left aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for left shifting the byte fields accessed from said memory unit in a read operation, by a number of bytes equal to $2^N$-1 minus the value of said sum, in accordance with said control word;

said shifting means right shifting the left justified byte field input from said processor register in a write operation, by a number of bytes equal to $2^N$-1 minus the value of said sum, in accordance with said control word;

a read formatting means having a data input connected to said length register and a control input connected to said control word register, for inserting zeros in the number of rightmost byte fields equal to $2^N$-1 minus the value of length register contents, for the byte fields read from said memory, in accordance with said control words;

a write formatting means having a data input connected to said pointer register and a data input connected to said sum output of said binary adder, for identifying the group of contiguous byte lines on said memory bus between the byte field number equal to value of said sum and the byte field number equal to value of said pointer, over which bytes are to be written into said memory unit;

whereby less than $2^N$ contiguous bytes can be selectively written into said memory under the control of a single control word.

15. An information processing system, comprising:

a random access structured memory unit addressable in words of $2^N$ bytes;

a storage address register connected to said random access memory unit for addressing words stored therein;

a processing unit having a processor register having $2^N$ byte fields numbered 0 to $2^N$-1 from the right for storing left aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for left shifting the byte fields accessed from said memory unit in a read operation, by a number of bytes equal to $2^N$-1 minus the value of said sum, in accordance with said control word;

said shifting means right shifting the left justified byte field input from said processor register in a write operation, by a number of bytes equal to $2^N$-1 minus the value of said sum, in accordance with said control word;

a write formatting means having a data input connected to said pointer register and a data input connected to said sum output of said binary adder, for identifying the group of contiguous byte lines on said memory bus between the byte field number equal to value of said sum and the byte field number equal to value of said pointer, over which bytes are to be written into said memory unit;

a control word branch unit having a control input connected to said carry output of said binary adder and a data input connected to said control word register;

a control word storage having an input connected to said branch unit and an output connected to said control word register;

a first gate means for conditionally connecting the input of said length register to said sum output of said binary adder when a carry signal occurs indicating the accessing of a multibyte field which lies in two contiguous words of said memory;

a second gate means for conditionally setting the input of said pointer register to zero when said carry signal occurs;

said branch unit responsive to said carry signal from said binary adder to access from said control word storage a second control word which is loaded in said control word register to initiate the accessing of the second portion of said multibyte field in the leftmost of said two memory words;

said sum output loaded into said length register representing the length of said second portion of said multibyte field;

whereby a multibyte field can be written across a memory word boundary in said memory unit under the control of two control words.

16. An information processing system, comprising:

a random access structured memory unit addressable in words of $2^N$ bytes;

a storage address register connected to said random access memroy unit for addressing words stored therein;

a processing unit having a processor register having $2^N$ byte fields numbered 0 to $2^N$-1 from the right for storing left aligned data and a control unit having a control word register for storing a control word specifying a read or write operation and the byte length of the field to be accessed in said memory unit;

a shifting means connected to said processor register by a $2^N$ byte wide processor bus and connected to said memory unit by a $2^N$ byte wide memory bus and having a read/write control input connected to said control word register;

a length register connected to said control word register for storing in binary the value of one less than the byte length of the field to be accessed in said memory unit;

a pointer register connected to said storage address register for storing the N low order binary bits of a storage address;

an N-bit binary adder connected to said length register and said pointer register, and having an N-bit sum output and a carry output, for adding the contents of the length register to the contents of the pointer register;

said shifting means having an input connected to said sum output of said binary adder, for left shifting the byte fields accessed from said memory unit in a read operation, by a number of bytes equal to $2^N$-1 minus the value of said sum, in accordance with said control word;

said sum output loaded into said length register representing the length of said second portion of said multibyte field;

a cross boundary formatting means having a control input connected to said control word register, a data input connected to said length register, and an output connected to said shifting means, to conditionally reset byte fields numbered $2^N$-1 minus the value of contents in length register to $2^N$-1, in said shifting means in response to said second control word when a memory read is specified;

said second control word specifying that said read formatting means be inoperative during the accessing of said second memory word so that the byte fields accessed therefrom are loaded into said shifting means without disturbing the byte fields accessed from said first memory word;

whereby a multibyte field can be read from two contiguous memory words and be stored left justified in said processor register under the control of two control words.

* * * * *

UNITED STATES PATENT AND TRADEMARK OFFICE

CERTIFICATE OF CORRECTION

PATENT NO. : 3,916,388

DATED : October 28, 1975

INVENTOR(S) : Everett Montague Shimp, et al

It is certified that error appears in the above-identified patent and that said Letters Patent are hereby corrected as shown below:

Col. 23, line 59, delete "was" and insert --word--.
Col. 27, line 40, after "word" delete the --.--and insert -- ; --.
Col. 27, line 54, delete "righmost" and insert --rightmost--.
Col. 30, line 57, delete "memroy" and insert --memory--.

Signed and Sealed this

*thirtieth* Day of *March 1976*

[SEAL]

*Attest:*

RUTH C. MASON
*Attesting Officer*

C. MARSHALL DANN
*Commissioner of Patents and Trademarks*